US008941485B1

(12) United States Patent
Mendelson

(10) Patent No.: US 8,941,485 B1
(45) Date of Patent: Jan. 27, 2015

(54) SYSTEM AND METHOD OF OBTAINING AND USING A VEHICLE IDENTIFIER FOR PROVIDING INFORMATION TO AN END USER

(76) Inventor: Ehud Mendelson, Coral Springs, FL (US)

(*) Notice: Subject to any disclaimer, the term of this patent is extended or adjusted under 35 U.S.C. 154(b) by 0 days.

(21) Appl. No.: 12/932,811

(22) Filed: Mar. 7, 2011

Related U.S. Application Data

(62) Division of application No. 12/069,899, filed on Feb. 13, 2008, now Pat. No. 7,924,149, which is a division of application No. 11/472,706, filed on Jun. 22, 2006, now Pat. No. 8,896,485, which is a division of application No. 11/429,864, filed on May 8, 2006, now Pat. No. 8,836,580.

(60) Provisional application No. 60/678,947, filed on May 9, 2005.

(51) Int. Cl.
*G08B 1/08* (2006.01)
*G01S 1/68* (2006.01)

(52) U.S. Cl.
USPC ............. 340/539.11; 340/539.13; 340/572.1; 342/463

(58) Field of Classification Search
USPC ............. 340/539.1, 539.11, 539.13, 539.18, 340/572.1, 988, 995.1; 342/357.06, 357.13, 342/463, 464, 465; 701/211, 467, 468; 235/380, 382; 379/201.04, 207.12
See application file for complete search history.

(56) References Cited

U.S. PATENT DOCUMENTS 7,933,395 B1* 4/2011 Bailly et al. ............. 379/201.04
8,770,477 B2* 7/2014 Hefetz ........................... 235/382
8,896,485 B2* 11/2014 Mendelson ................... 342/463

* cited by examiner

*Primary Examiner* — Van T. Trieu
(74) *Attorney, Agent, or Firm* — Allen D. Hertz, P.A.; Allen D. Hertz

(57) ABSTRACT

A precise navigation system utilizing a fleet of deployed RF beacons and an associated application. The RF beacons are installed in known locations about a predefined facility area. The RF beacons emit either a Bluetooth or Wi-Fi beacon signal. An RF beacon identifier is encoded into the beacon signal. The location of the beacon is determined by using the beacon identifier in conjunction with a beacon location index. The location can be used to determine a location of the receiving mobile device, initiating conveyance of information associated with merchants in the proximate area, assistance for parking, etc. The system can be employed to assist in emergency conditions, obtaining road sign information, and other applications where RF beacons can transmit specific location based services and information.

18 Claims, 13 Drawing Sheets

SYSTEM AND METHOD OF OBTAINING AND USING A VEHICLE IDENTIFIER FOR PROVIDING INFORMATION TO AN END USER

RELATED APPLICATIONS

This application is a Divisional Application of U.S. Non-Provisional patent application Ser. No. 12/069,899, filed on Feb. 13, 2008, now U.S. Pat. No. 7,924,149, which is a Divisional Application claiming the benefit of U.S. Non-Provisional patent application Ser. No. 11/427,706, filed on Jun. 22, 2006, now U.S. Pat. No. 8,896,485, which is a Divisional Application claiming the benefit of U.S. Non-Provisional patent application Ser. No. 11/429,864, filed on May 8, 2006, U.S. Pat. No. 8,836,580, which claims the benefit of U.S. Provisional Application 60/678,947, filed on May 9, 2005.

FIELD OF THE INVENTION

This invention is directed generally to the field of navigation and, more particularly, to a method and system to be used to provide infrastructure that can enable indoors or outdoors navigation and special local based applications in a mall store buildings department store and to provide local based services directly to the user navigation or mobile phone.

BACKGROUND OF THE INVENTION

The scope of the present innovation:

The disclosed invention resolves a great deficiency in the technology available for local businesses especially indoor or in places and area where GPS or other existing technology can't provide indoor navigation and the accuracy needed, Location Based Services (LBS) represent a huge advertising and mapping market—estimated at over $150 billion a year. It represents a big opportunity in the navigation market that has not been explored yet.

Existing System and Industry Trends:

Local mapping today is mostly paper: Mall maps, store maps, mapping of department stores, commercial buildings, hospitals, schools, campuses, municipalities, shopping centers, down town districts, indoor facilities, building maps, parking areas, parking garages, amusements parks, subway systems, transit maps, museum maps, area attractions maps, hotel and resort maps Cruise ships and even more importantly the emergency maps and procedures posted in buildings.

Factors in local mapping: Local maps can be of either indoor or outdoor locations.

Local maps are available on paper, on the web and in some cases on a kiosk in the facility or map available from some providers but not a navigate map just informal map.

A high degree of accuracy is needed in order to provide usable maps for navigation indoors—below 5 m and even below 1 m—to a store to a product in the shelf or even a parking space.

GPS cannot provide acceptably accurate mapping as it is only accurate to within 100-200 feet. This is the reason that the GPS industry does not provide this type of mapping. The same is true for cellular network providers, as the accuracy is also 100-300 feet, and then only when the signal is available. Signal availability is often a problem indoors and also when it is most needed—in an emergency situation when most of the cellular network fails due to high demand. Again, this is the reason that there is no local mapping available for cellular users. (Local mapping equates to accuracy in finding a store, room, or parking level within 1 m.)

At this time there is no indoor navigation solution and no infrastructure that can answer to that need. The most recent technology provides access to a user's location through a combination of group "social networking" and a "buddy list" or "check-in" or "poor man navigation"—the user need to tell where he is.

Most technology available today attempts to "locate" a moving "user" in an area, this invention reverses that idea and lets the "user" navigate the local area on the local maps.

Indoor navigation vs. Outdoor navigation Pedestrian navigation is more than locating and navigating, most likely they are at or near their destination already. There are two possibilities, either they are in unknown surroundings and their task will be to explore the surrounding or they are looking for a specific product—their defined goal is like buying a new pair of shoes or getting a book or just going to shop around, exploring a new location, new deals, sales specials, or simply sightseeing.

The theory behind the invention is based on the belief that "you are what you do" meaning—the service, special sales, coupons discount. This is one key.

The main task of indoor navigation in a mall or inside a store is to show the user where the specials, sales, and coupons and director navigate the user to them. The integration of multimodal journey planning and guidance to dynamic waypoints, Sales, specials, etc . . . and complex public interchange facilities are not adequately addressed by existing systems.

In some aspects, indoor navigation looks simpler than outdoor navigation. For instance, the geographical area covered is much smaller and the expected speed of travel (walking) is much slower. However, other aspects make indoor navigation much more challenging. First among these is the unsuitability of a Global Positioning System (GPS) and related technologies. Second is that in a complex indoor environment the requirements are more stringent. For example, vertical positioning of the topology and the need for accuracy less than 5 m—to the store, the product, and even to the aisle or the parking space cannot be achieved with today's existing system.

The indoor market represents much greater potential than outdoor navigation, as on average individuals spend more than 90% of their time indoors.

The objectives and goals behind the present invention include:

The technology behind the present invention is quite simple: a direct communication between the user device (such as a cell phone), a Wi-Fi or Bluetooth enabled device like most of the new mobile phones, and Wi-Fi or Bluetooth tags/sensors/beacons installed in known locations within an area/building/store facility, without relying on GPS, local centralized servers, Internet bandwidth or even cellular communication—or cellular identification (ID) they can be supportive are but not essential.

The main concept is to use existing, off-the-shelf technology and devices with a minimal cost of deployment and to provide a simple indoor/pedestrian technology, which delivers accuracy with an integrated suite of applications especially designed for the user/shopper within an indoor environment.

The system includes:

An ability to load local mapping at the facility or pre-load local maps via an application or the Internet prior to arrival at the area.

Ability to have special navigation software either as an add-on to existing navigation on the user's cell phone or existing navigation system (car, mobile).

Deployment of Wi-Fi or Bluetooth beacons in the local area where each beacon will be installed in a known location or a waypoint to provide the infrastructure needed to navigate in the area. The infrastructure provides a very low cost and fast deployment beacon system.

Ability or option to use the log of the "user" Bluetooth or Wi-Fi ID or the Wi-Fi or Bluetooth naming ext. as a key (not cellular number) for future marketing purposes or for emergency use. This aggregation of data will be invaluable to retailers, etc. for example Bluetooth enabled cell phones or old Bluetooth head phone can be used as beacons (potentially a good use for millions of old cellular phones), also Wi-Fi routers can be serve as beacons when install in key area on location and serve as part of the infrastructure to enable the indoor navigation.

System Segments:

The beacons—are RF Bluetooth or Wi-Fi tags/beacons installed in known locations in the area/facility and represent "waypoints", store/special sales, places etc.

The scanner detection—Whenever a mobile phone or mobile device with a Bluetooth or Wi-Fi capacity is switched on and loaded with the subject application, it will periodically scan the area for the associated RF/Bluetooth/WIFI beacons; proximity to a tag/beacon will determine the "user" location on the area/facility map, triangulation method can be also used.

The navigation—Can be plotted between waypoints/store/places on the map.

The sale sense—marketing tools option—the disclosed system works by passively observing the initial part of the scanning of movement. The disclosed system does not monitor or listen to conversations or text messages. Nor does the system transmit or intercept any information or interfere with the mobile network operators in any way. The disclosed system is a scanning detector done by the user (not a receiver or transmitter) which can observe the unique RF Bluetooth/Wi-Fi ID/key set of the device (not a tel. # or name . . . ) and aggregate resultant data.

The existing central database method of The waypoint database by GOOGLE, APPLE, SKYHOOK and NAVIZON provides "software only" location platform database that use central base data of collected Wi-Fi ID to allow add-on determination of the location of the user with accuracy around 20-50 meters and up and used mostly outdoor as add-on to GPS navigation, it based on collected Wi-Fi router ID by a scanning devices mostly special scanning cars), the car scan the area for "someone else" router without permission and knowledge of the user and the Wi-Fi ID is added to a central data base that needs to search and match with the user IP for additional proximity detection.

Such system use today are not available indoors as indoor navigation and LBS application especially inside store needed precise accuracy; below 1 m to even a product in the shelf, where the current system and method are above 20-50 Meters.

Moreover, the system and method that is used today depends on "someone else's" beacons/device and the user can move it or change the name or just shut it off, there is no control of the beacons/the waypoints by the providers.

Also because the way the information is collected there is no current information inside restricted area like complex, buildings, in-store, in-ship, cruise, and others indoor facilities.

And the biggest problem of all is a privacy issue. As described, the information is collected without the user's knowledge or permission, which creates a big issue.

Also the matching process and the access for a central database are costly and slow and depends on matching a router or Wi-Fi ID to the right address/location.

Moreover, the existing method of the central database depends on GPS and cellular ID.

The disclosed solution to the central database and the limitation of such system and method is as follows:

Instead of a "software only" method where there is no control of the beacons the disclosed system and method provides physical beacons owned or controlled by the provider.

Instead of building costly central database that need to match the ID to the real address in the disclosed solution the ID is the address, meaning the system doesn't need to match xyz112x to be the real address, instead the ID=real physical address/location there is no matching needed.

Such central database as used today may be good for outdoor but not when there is a need for more precise detection especially indoor where the area/building are small and the "waypoints" or Points of Interest (POI), the beacons list are in small number and can reside on the user mobile phone loaded area map and there is no need to access and verify in a database.

Such system and method as explain will eliminate the need for the costly scanning car that the providers use today and will provide more control and solve the privacy issue existing with the other method.

The disclosed method will provide infrastructure that is deployed indoors; in-buildings in area that are not enable today as to the problems describe above.

It all will come to the cost of the beacons, to the cost of the infrastructure, it is believed that at a cost of around $10 a beacon with the introduction of the business model where the business owner pay to be publish as a Point Of Interest (POI) on the local map and have in the first time the opportunity to allow additional information trigger by the beacons and deliver by other communication method according to the user location indoor or outdoor.

As explained above, what is required is a solution for the immediate need for better accuracy, better control and the privacy issue and a solution that will eliminate the depend on "someone else" hardware or "software only" method.

Another important differences is that in the present invention, the beacons are autonomous; not in a network; and doesn't need any bandwidth or being connected to the Internet. All the location determination is done at the user's mobile phone without a need for a central system. The Internet or the cellular communication would be triggered by the location determination set by the beacons.

Example of scenarios:

A user in a mall can load the mall maps to a mobile phone prior to arriving at the mall/store.

A navigation application on the user's mobile phone will scan signals from known locations, more specifically, RF Bluetooth or Wi-Fi beacons, and will determine the "user's" location on the local mall map (the same way as a GPS) with accuracy of less than 5 m. (It is noted, the greater the number of beacons with LESS signal range, the more accurate the location determination process)

The assumptions are based on the following facts:
  Globally, more "users" carry mobile phones than any other device.
  GPS and other existing mapping solutions are not accurate enough to handle a local mapping need, particularly indoors where satellite signals are not available.
  On average people spend more than 90% of their time indoors.

RF Bluetooth and Wi-Fi protocols are the most used communication method today and they are installed in more than 90% of all new mobile phones.

The technology already exists.

The present invention is based on direct communication scanning for the installed RF Bluetooth or Wi-Fi beacons and the user's mobile phone without the use of a cellular network, GPS, the Internet, or a local central system.

The available local advertising Nay Conference marketing is huge, with over $150 billion in revenue in the US alone.

Indoor LBS applications can include:

Nav Parking,
Nav Realty,
Nav Mall,
Return 2 Parking,
Nav cruise/hotel/resort,
Nav Store,
Nav Sale/special/deals/coupons,
Nav Museum,
Nav Show,
Nav Train/airport/port,
Nav Theme Park,
Nav Sign,
Nav Emergency,
Nav Events, The present invention offers a complete suite of applications from finding an available parking spot to navigation of indoor malls/stores and with a capacity to navigate to emergency exits with a low cost to implement and with a business model that can be used to attract customers.

The application represents a big opportunity in the navigation market and will open up new avenues for companies from telephone operators, mall store department store owners, to navigation and mapping companies.

The present invention provides a low cost and easily deployable infrastructure for local based navigation outdoors and indoors without the need for GPS and or cellular networks. Moreover, the concept is especially suitable for local area (indoor and outdoor) services when and where the GPS and the cellular network can't provide the solution and the accuracy needed to provide such navigation (5 m or less).

The present invention integrates existing technology that is proven to be stable, simple, inexpensive and mature in market use. Moreover, it is a common communication tool and is available on most of all new mobile phones.

System architecture: The infrastructure consists of Bluetooth or Wi-Fi beacons installed in known locations within a local area. The beacons will respond to Bluetooth/Wi-Fi device scanning inquiries made by a "user's" mobile phone or other Bluetooth/Wi-Fi device operating an application program.

The known location of the beacon is set in a small local database: the table of the beacon (waypoints=the beacons identities according to the Bluetooth/Wi-Fi address/name of the beacon) is attached to the local area mapping of the area.

The local area map (mall map, store, building map, area map, etc.) will be available to be downloaded at the entrance of the building/mall/area or the directory places to provide the mapping for the navigation.

A "user" can also download the mapping before approaching the place to be navigated, from the Internet or using application contain mapping database.

A user's Bluetooth/Wi-Fi mobile phone will scan the local area for the location beacons. When a user is within proximity to the beacon, the location beacons respond, providing superior accuracy compare to the regular GPS or navigation used today and the exact need to enable indoor lbs and navigation accuracy. With multiple beacons installed and possibly receiving more than one beacon's signal, a simple triangulation calculation and options for signal strength will determine the exact location of the user on the map of the local area.

Other signals not on the database list will be ignored.

Sales sense, next generation marketing tools, the behavioral option module is as follows:

Recent published research showed that on average individuals spend 90% of their time indoors. Moreover, according to research, indoor navigation may be more important than outdoor navigation and may represent a huge new market.

The disclosed technology allows shopping centers, malls, department stores, buildings, airports, train stations, exhibition centers, museums, resort and even cruise ships and amusement parks to understand the way that their customers or passengers flow through their premises. At the same time it provides the user/shopper with unique indoor navigation capability without compromising user privacy.

The disclosed innovation will allow, for the first time, the navigation and GPS industry to tap into the local advertising market, estimated to be over $150 Billion in the US alone.

The disclosed technology provides a reliable method for identifying the path habits and the behavior that people take through an area.

There are a number of advantages to the disclosed technology including:

Extremely large sample size as mobile penetration is above 90% Shoppers remain anonymous Accurate to within 5 m Based on a Bluetooth/Wi-Fi technology.

For retail areas, malls in particular, the advantages of understanding shopper behavior are significant. Such information can assist the mall to:

Evaluate and improve their retail tenancy mix by identifying which stores shoppers consider complementary,
Identify underutilized areas in the mall,
Understand the impact of anchor stores on the mall,
Measure the implications of particular promotions or center events,
Assist with planning day-today mall operations Provide add-ons for the shoppers,
Provide shoppers with a "web" like shopping experience,
Provide shoppers with incentive/advertising,
Increase security, and
and in an emergency, provides the shopper(s) with alarm and notification.

The disclosed technology would be the only system available that can continuously and accurately gather information along shopper paths without the need for Internet or cellular communication and all without compromising the shopper ID or his privacy.

Over the past 7 years the proposed concept has evolved into a unique and innovative system and method that can also provide a way of surveying the behavior and preferences of the user shopper simply by observing the anonymous signals (encoding Bluetooth naming key+Bluetooth/Wi-Fi ID) given off by their mobile phones and at the same time provide the shopper with a unique special application for indoor navigation.

The present invention offers the next generation approach to the LBS market, especially to indoor applications and to areas where a GPS cannot provide accurate navigation and LBS services.

The anonymous data collected using this technology can be used to provide trend reports showing which shops are most visited and at what times, whether there are sufficient public facilities to serve the visiting shoppers or whether more security staff are needed to name only a few of the potential benefits. Ultimately, the data collected by the proposed system assists shopping centers to become more in-tune with their customers so that they can create better, more pleasant places to visit.

The analytics associated with the present invention can turn a shopping center, a department store, or a store into finely tuned site, enabling mall/store owners to direct the flow of traffic efficiently around.

In contrast to alternative techniques, there is no device that tracks the user's cell phone. In the proposed method, the user's device/cell phone scans and tracks tags/beacons along the route, whereby each scan includes the cell's unique Bluetooth/Wi-Fi ID (think IP address), and while these ID's help track the movement of the signal and its owner, they don't reveal the identity of the user. This is a more precise method than what GOOGLE maps uses to detect a general location on a mobile phone by cell towers which are accurate between 300-1000 m compared to the accuracy of the present invention, which is below 5 m.

Some reports about shoppers show how valuable behavioral information actually is, and the profit opportunities that come along with this.
  Where they go?
  Where they go next?
  Where they do what?
  When they do what?
  Who does what?
  Understand behavioral patterns across demographics. Similarities, differences and much more.

Sales Sense User Preference Option Module:

Every day millions of people access the Internet and enter their profile, personal information, or answer questions about their preferences in order to access a service/site, to get incentives, coupons, specials, etc. These sites use the information for marketing and in some cases, share or sell the information. Recent research has found that most people are willing to give information for incentives.

Using the profile and records, the surfing habits of the user (IP address) is the way that all the search engine companies make money on the Internet. At the same time they try to direct the content to the user according to the user's profile/habits.

But what about real life? As individuals spend more and more time indoors (again, according to recent research, people spend more than 90% of their time indoors).

A scenario of searching for store/item, special sales, and coupons is repeated again and again . . . . The question is how can the system transfer the success of the Internet marketing tool and the easy search for the real life? That is the main idea behind the disclosed invention—what if one can take the profile/the user input with them anywhere and not depend on communication at all, no Internet nor cellular communication is required and more importantly without compromising the user's identity. Moreover, the user is in complete control over their privacy, more than when surfing the Internet!

In the disclosed innovation, using the associated software, the user enters their profile sales preference and their profile sales preference is encoded into the user's cell phone. Bluetooth/Wi-Fi naming as a key (Sequence of numbers and letters, much like a VIN# in cars), the key takes part of the Bluetooth/Wi-Fi device address and the user's profile to encode a key.

There are 3 ways in encoding generating the key: (A) set segment—the segment keys are not unique and helps to setup the user segment only. In that case the key is not unique and sharing the key presents no privacy issue. (B) to generate a unique key—to be used like the Internet IP. Can be use with minimal user exposes or when users are "register" customers and willing to receive additional incentive as store customers. (C) creates a dynamic key and multiplies profile according to location/user preferences.

The profile can include: Gender, age or age range, and sales preference (interest), and does not include any personal profile. The profile may be the same as seeing the user and recognizing their gender, age-range, and other preferences just by looking at the user. The user ID does not reveal any kind of information that most of websites ask for in a registration process and no personal information, wherein Name, address, and/or telephone # are exposed.

As part of the associated suite of LBS applications, the user's phone will scan the area for the tags/beacons. The infrastructure of beacons will provide accurate location determination and trigger 3rd party delivery of the right content information to the user according to a decoding of the user key and location will allow the 3rd party to use the user preference segments and provide the user with ads, specials, and incentives according to their profile "Your customer is telling you what they want, are you listening?"

The main idea behind this is to provide the user with pin-point content according to their desired preference at the location and also direct/navigate them to the desired location where they can find the store/sales/special/coupons or the information that they are looking for, at the same time there is also a benefit to the sale/mall store owner by getting the next generation's sales tools, getting customers' habits and their sales profile, and able to serve better and accordingly the customers.

The sales sense, a user preference module is an add-on to the sales sense marketing where it joins the user's behaviors module to create a very unique LBS business and marketing model the analysis of these spatio-temoral data can supply high level human behavior information valuable to urban planners, local business and the Local Based Services (LBS) marketing.

Mall/department store/store indoor applications can all be included as part of a nav4mall/store suite.

The following indoor applications can be enable to use indoor by using the associated infrastructure:

Map and indoor Navigation is an application which brings the local mall/store map to the digital age, allowing download at the directory stand or pie load from Internet site prior to arriving. The application provides an ability to navigate from waypoints to waypoints on the map directory, essentially bringing the store/mall directory to the cell phone.

Search and Find is an application where store/place/item products that are on the directory represent waypoints/tags/beacons on the loading maps.

Sales/specials is an application where discounts, sales, and coupons can be added-on or a replacement to a mall or store flyer, wherein the application provides the shoppers at points in the mall or store, it can even direct the user/shopper to the aisle with the products/coupons and directs the shoppers to what they looking for.

Parking and return2parking, although not directly the same beacons (for the parking the invention uses long range beacons where in store/mall the beacons are short range) is a service which assists the user in finding available parking spaces and a process for informing the user of the location of their parked car.

Info is an application that provides information about events, restrooms, ATM location, seating area, Kids playground, fountain, public phones, etc. to the user.

Emergency, which is a very important part of the present innovation, offers a solution to provide the user with a unique alarm and notification of an emergency situation without depending on other communication links, such as cellular phones, which are prone to failure in emergencies. The disclosed innovation provides the user with the building/mall/store/place emergency procedure according to the user location and in emergency will help navigate the user to safety.

Panic is an application that enables the user to request a beacon locating transmission to help in finding the user in an emergency condition, wherein this application can alternatively be referred to as a scan4life method.

Regarding Privacy: The system does not collect personal information such as name or phone number. It does, however, record the phone's Bluetooth/Wi-Fi identification number to build a profile of the user or the use of the phone in the area. It is like surfing the web here a user's IP address is recorded for future marketing statistics and surfing habits (with permission from the user). Also as part of the process of introducing the encoding key into the Bluetooth device (user profile) as describe in the sale sense part, the privacy and security increase to the level where viewing the key broadcast by the Bluetooth/Wi-Fi device can't revile any user's Identity unless the user requests to be register to get incentive specials, sales, etc., even then the user's name or other personal ID are secure and only the Bluetooth/Wi-Fi device key/ID are recorded.

Marketing: By directly targeting the consumer standing right outside a business, an event, or walking toward a kiosk or restaurant, merchants can maximize their marketing budget while incorporating a new, inexpensive and effective form of advertising.

The user is in complete control. They can disable their application any time or just reject content, there is no spam effect and the user is attracted by incentives rather than generic promotions. In a mall like environment a user's incentive to use of the disclosed innovation can be further enhanced with the use of the associated advantages and packages.

Isn't this all a bit like "big brother"?

Not at all, and it isn't even "little brother, It's much less intrusive or invasive than existing methods that are already in widespread use—for instance CCTV cameras and number plate monitoring as they do collect personal information such as your image or car number plate. The disclosed innovation represents the next generation shopping experience in shopping centers, malls or stores and fits very well with today's business model. Such a service can be offered for free to the "users" and backed by advertising and the use of the data by the stores. Such service and application and the ability to include the full "suite" of applications especially designed for shopping malls/stores and include the emergency part of it will also ease the fear of "locating" or any other privacy issue.

The disclosed innovation represents the next generation shopping experience in shopping centers and malls and fits very well with today's business model. Such a service can be offered for free to the "users" and backed by advertising and the use of the data by the stores. Such service and application and the ability to include the emergency part of it will also ease the fear of "locating" or any privacy issue.

For the first time the shopper will experience Internet type marketing in the traditional sales and advertising venue.

Here are the benefits consumers could see from shopping center stores or even resort/cruise using the disclosed technology:

A. Better in-mall inside events; the disclosed system can monitor how successful they were by monitoring the sheer volumes of people attending and for how long.

B. Provide shoppers/guests with next generation sales tools: navigation in your mall store area ships or facility directly to the sales or specials that you want them to go to.

C. Add-on to the store/mall/ship/hotel/resort/building directory and the in-store mall cruise resort building flyer.

D. Take the guessing from the customer's next wants; then send them directly to the products coupons special they might want.

E. Eliminate congestion within the shopping centre—the disclosed innovation can help centre management understand whether opening hours need to be extended or whether the centre layout needs to be improved to avoid congestion.

F. Improve shopping center and public facilities efficient—the disclosed innovation's data helps managers to understand which parts of their facility are very busy which means they know when to deploy extra employee/cleaners/security to ensure proper service.

G. Better security; over-crowding also leaves shoppers vulnerable to pickpockets and other security risks. The disclosed system can identify congested areas and ensure security personnel are deployed appropriately. And in an emergency, the disclosed system can provide instant alarm and notification, even if the cellular communication or another communication system is not available.

Altogether this makes for a much better shopping experience, it is believed that shopping should be an enjoyable pastime. Who wants to go to shopping center that are congested, poorly laid out, have dirty toilets, are badly positioned for transport links and which pose a security threat to visitors?

The facilities owner can get a better understanding of how people use their center such as the order of stores/area/facilities they visit and the time they spend in different areas of the centre/ship/building.

Similarly it could help museums/amusements parks/resort or even cruise ships identify their most popular exhibits and help exhibition companies plan their venues more carefully around visitor traffic flows.

The instant invention provides the center with quantitative feedback on whether the changes they make in the mall/area are successful. One of the ways to do this is by looking simply at how long shoppers/guests tend to stay within a mall/area.

In the past malls/area/building/cruise have focused solely on looking at the numbers of shoppers/guests that they are drawing through the doors (footfall) but when combined with dwell time, they can get a much more accurate predictor of their performance and statistics.

The business model—Next Generation Marketing: The web advertising and the main focus of search engine success is based on technology that tracks the web user's habits and provides him with related ads according to his interests.

Using the disclosed infrastructure of a Bluetooth/Wi-Fi beacons and the associated applications in a mall, store or shopping center, or in any other indoor facility, such as in a resort or cruise ship environment, the disclosed innovation will represent a very unique ability to bring a web like shopping experience by its ability to keep up on the user's surfing or shopping habits in the shopping center, mall, or store. The system will provide a better shopping experience (coupons, specials sales, according to the user's shopping habits) and service to the shopper.

Even though it may look like a privacy issue, the add-on services, the application, and the idea that it may save the user's life (nav4emergency application) combined, with the fact that it does not reveal the person's name or telephone number, it is the same as the everyday use of surfing the Internet when the user's IP is recorded by the web sites and provides the basis for the "ad sense" or the web marketing tools, which can be referred to as "sale-sense".

It is believed that introducing the disclosed system and the marketing tools above can help the users and the sellers to upgrade the real shopping experience of today with the advantage of the web like tools.

The disclosed innovation represents the next generation shopping experience in shopping centers, malls and fits very well with today's business model. Such a service can be offered for free to the "users" and backed by advertising and the use of the data by the stores. Such service and application and the ability to include the emergency part of it will also ease the fear of "locating" or any privacy issue.

For the first time the shopper will experience Internet type marketing in the traditional sales and advertising venue.

The disclosed innovation provides valuable solutions that enhance the effectiveness of ad campaigns. The ability to optimize performance in real time has a positive effect on advertiser satisfaction. The fact that this service is well integrated into the disclosed system is a tremendous advantage.

The disclosed innovation is a performance-enhancing technology, providing great data and allowing improved customer service.

It can be an extremely effective way to optimize the performance of offline/online advertising campaigns in the mall/store environment. For excellence in client services the idea is a clear win-win for everyone.

Helping to understand where users are going in the mall/store in real life and their buying behavior patterns will allow the merchants to continually adjust offers, placements and creative content to improve buy-through and maximize sales.

The disclosed system will evolve the mobile content into a bonfire revenue center that will benefit the shopping mall operator and merchants alike.

The "user" is in complete control. He can disable his application—blue umbrella application any time or just reject content, there is no "spam" effect and the "user" is attracted by incentives rather than generic promotions.

Probably the best technical analogy would be to compare the disclosed technology with existing web-based systems that measure viewers of web sites, for example GOOGLE ANALYTICS.

These systems work by embedding tags within each page of the web site being measured, so every time a visitor views a page on the site the tag is flagged. This enables the system to collect information on how a visitor viewed a site. This system won't collect any personal information but it will collect the temporary Internet address of your computer to uniquely identify you (not as an individual but for instance as "Visitor Xyz75a") as well as information on how you use the website such as the order of pages you visited or how long you spent on each page. In a very similar observation, the unique Bluetooth/Wi-Fi naming key that setup a user pre define profile key to provide the user with ad/specials/incentive according to their segment and all with complete user anonymity.

Why use Bluetooth or Wi-Fi for indoor location? Bluetooth has some advantages in the context of indoor location. These include:
a. Bluetooth uses RF—in the 2.4 GHz ISM band, specifically. In this frequency range, radio waves penetrate obstacles, such as walls and human bodies, albeit with a substantial loss.
b. Bluetooth is ubiquitous—Bluetooth chipsets are being implanted everywhere nowadays (phones, accessories, computing devices, etc).
c. The fact that a Bluetooth location system can locate any Bluetooth enabled device makes it more cost-effective. This means that an increasing fraction of humans and mobile assets around would become locatable in a Bluetooth covered site, with No additional hardware cost (no tags attached). The only need is to pre-register these devices.
d. Bluetooth is a low power technology—the proposed tag can operate using a battery for more than 6 months, which is a big advantage over Wi-Fi or other technology.
e. Bluetooth is a low cost technology. The high expected production volumes (hundreds of millions annually) lead to sub-$1 per chip. This goal has already been met by several IC manufacturers. This would eventually result in a low price for the Bluetooth tags, and Bluetooth location systems would become sufficiently ubiquitous.
f. Bluetooth is a multi-functional communication standard—location is only one of the services that can be supported by a Bluetooth infrastructure. The same infrastructure can be used to provide additional network services, particularly remote monitoring and control (by using a serial interface). In addition, Bluetooth provides voice and IP services.
g. In open spaces, relatively free of obstructions and walls (e.g. a large warehouse or a public hotspot), Bluetooth alone would suffice to provide a sub I meter accuracy and that is the range for locating products in a store in a mall or even go to a product in a shelf.
e. With the recent introduce of Bluetooth 4, the tag concept become reality also in term of low power special design for beacon/tag operation and increase range to over 600 m—even more than Wi-Fi.
f. Even so that there is a clear advantage of using the blue tooth, the disclosed innovation also covers the use of Wi-Fi tags and the ability of use the existing Wi-Fi equipments with the disclosed innovative method as part of the infrastructure to enable indoor LBS applications.

Applications:

The system use and costs should scale well with its ability for multi use in an emergency and in non emergency to provide local navigation on malls/store campuses, buildings, hospitals, hotels, cruise ships, resorts malls, etc., without GPS or a cellular network using the Bluetooth or Wi-Fi beacon for navigation. Some of the key applications that can be enable to be use by the disclosed infrastructure are:

Mall Store Sale or just University or Building Navigator, Explore the indoor mall or inside a department store, in resort or cruise ship navigate to the right place or the store or the department that you need. Navigate on the mall map, the store map, the resort map, or the cruise mapping to find your way around each respective environment using your mobile cellular phone or navigation system without a GPS or even without need for cellular communication at all. A new kind of service and new marketing way for the malls/store/resort business owners an add-on to local advertising.

With an indoor navigation based on the local map/mall that will provide the user a navigation to his desire location in the mall/store to the right, and receiving content according to his pre define preferences the user can be directed to a store, a product or even an isle inside the store as well a new marketing tool to the store and/or mall owner to get the customer with a new service. The store will have also an option to provide or deliver more content (advertising, sale, coupons, promo, etc.) to the user when he approaches the store and the delivery are trigger by the associated infrastructure of Wi-Fi/ Bluetooth beacons. And in an emergency, the Nav4emergency will kick in from the Nay-store mall suite of applications.

Museum Conference Show

Explore museum or conference show exhibits in a new unique and easy way, find your way around when navigating on the floor map of the museum conference or the show, indoor navigation, navigate to exhibits restaurants, cafes, lavatories etc. . . . all to the "user" navigation or cellular phone. Any Museum Conference or show provided to the attended a mapping to the exhibits, some provide also additional audio device (headset) to get more information on the exhibits. The disclosed innovation will provide a unique indoor tools that will allow the attended to navigate the museum, conference or show in an easy way directly to his Bluetooth/Wi-Fi enable cellular phone, when he reach his desire exhibit he will allow to download directly to his cellular and or Bluetooth/Wi-Fi headset information about the exhibits. An indoor navigation to the exhibits as well to the restaurants, cafes, lavatories etc. . . . All to the "user" navigation or cellular phone and based on the facility map. And in emergency—the nav4emergency will kick in.

Train and Transit Navigation

For all the users of mass transportation system the disclosed innovation will allow locate and point the user to the exact station or location on a route, an easy way to navigate in the train, subway, underground kind of system, a new way of a subway or bus mapping in/out door and directly to the user's navigation or his cellular phone. Every day millions of people are using the mass transportation system, trains, subways, buses, each of the passengers depend on the transportation map for the route information as well as schedules and additional services provided by the transportation system. Most of the passengers of today carry with them a cellular phone. The disclosed unique innovation will provide the passenger with the navigation inside the transportation system directly to the passenger's Bluetooth enable phone; the passenger will know exact location/station on the route as well with additional option information like schedules. A new add-on service to the transportation providers as well to the passengers, utilize the disclosed indoor navigation method, and in an emergency, the Nav4emergency application will kick in.

Theme Park or Amusements Park Navigation

Theme park and amusements Park navigation, navigate to your desire attractions as well with a new way for register to a "fast pass kind off lane all in an easy way to the "user" cellular phone without need for GPS Provides a new media add-on service. Ever wonder what it will be like to navigate inside the amusements park to the desired attraction, to know the schedules of the shows at the attractions and even to get your "fast pass" from a remote instead of standing in line. With the disclosed unique innovation all can be become reality and directly to your cellular phone without the need for a GPS or even cellular communication. It is believed that the disclosed innovation can provide a new tool and service to the benefit of the amusements parks as well to the user. And in emergency, the emergency part will kick in without need for cellular communication that trend to fail in emergency or in ### conj action### time.

Cellular next "Killer Application":

Emerging technology markets are always on the lookout for that elusive "killer app"—the precious, irrefutable application that makes adopters stand up, take notice, and open their wallets. Once it's found, and as soon as adopters realize firsthand the value to be achieved, that killer application eventually expands into other, more advanced areas of adoption and innovation. According to research, the next in cellular telephony will be service depend on location base programming, when the cell phone user will receive information according to his location.

There are more than 4 billion cell-phone users in the world. Each day, thousands more sign up. A variety of mobile devices have been developed in recent years that are capable of supporting dynamic navigation and location-based services applications. These include wireless telephones, PDA, IPAD and other smart phones personal navigation devices (PNDs) and laptop computers, the disclosed concept will work even on the old phones. It is believed that the disclosed innovation will meet the desire of wireless service providers to increase their average revenue per user.

SUMMARY OF THE INVENTION

In accordance with the present invention, these are the associated project's characteristics:

The main object of the present invention is to provide the infrastructure that can enable indoor navigation and a special application for indoor and local based services without the need for GPS communication, nor central system or even cellular ID or costly infrastructure are needed, the associated infrastructure serve as triggering mechanism to content providers, mapping providers navigation companies application providers and communication companies to be able deliver right content to the right people at the right time.

It another object of the present invention to provide a method of indoor navigation and special indoor application using a Bluetooth and or Wi-Fi enabled devices especially mobile phone.

It is another object of the present invention to provide a method of special application for mall/departments store or regular store, building down town centers resort cruise ships buildings and other facility area especially but not limit to indoor that lack such ability to provide LBS services today as to the problem describe before.

It is another object of the present invention to provide a marketing model method especially but not limit for the LBS market.

It is another object of the present invention to provide a business model method especially but not limit for the LBS market.

The foregoing and other objects of the present invention are achieved by providing an infrastructure of a Bluetooth/Wi-Fi beacons/tags installed in a known location in the area/facility, each tag/beacon have his own unique ID and a Bluetooth/Wi-Fi name to ID the location in the area, the tags/beacons broadcast the ID.

Mapping of the area/facility will be download at the area/facility or pre download before arriving to the area/facility, the mapping contain a lookup list of the tags/beacons installed in the area represent a waypoint on the map. Such method can eliminate the need for costly central database.

Application—on the cellular phone/Bluetooth or Wi-Fi enable device will scan the area/facility for the known list of the tags/beacons. ID/name when a Bluetooth/Wi-Fi tag that matches the list respond proximity detection establish with 1-5 m accuracy. When more than one beacon signal received a simple triangulation will be done to find the current location. Other Bluetooth or Wi-Fi device not on the list will be filter out.

The locating is established and will be display on the map. And because the location of the other tags/beacons is known navigation between the current location and a desire tag/beacons that represent waypoints are easy to achieve.

In reality no communication are establish at all between the tags/beacons and the cell phone.

The disclosed system is a navigation method based on the following unique characteristics:

The main idea behind the present invention is based on the concept of direct communication between mobile phones and a beacons/sensor (referred to as way points). No Internet and no cellular network are needed.

The system is based on Bluetooth or Wi-Fi communication protocol that is available on almost any new phone.

The disclosed innovation reverses the current and popular idea of "locating" the user by letting the user navigate utilizing to the set of beacons of Bluetooth or Wi-Fi beacons (whose signal is scan by the user's mobile device. This will allow LBS (Local Base System) navigation, even indoors without GPS or Cellular network.

To comply with privacy concerns the disclosed method takes the user's privacy to the highest level Although the disclosed method is like creating a cookie in the cell phone (not the same as Internet cookie where the cookie is generate and controlled by the web sites) but generated by the user and controlled by the user and more importantly—encrypted and secured as a key.

The user is in a complete control, they have the choice to turn it on or off at any time.

The propose system respects user privacy and do not collecting any personal Identification, like name address telephone number or other personal Identification.

Moreover the profile input by the user 1S encoded as a key, with multiple profiles to choose. The possibility of recognizing the user by the key is close to none.

There are three options for the user preference:
1. Only user segments generate key, no specific user Id.
2. Segments and part of the Bluetooth device ID encode as a key.
3. User can choose to be registered (membership privilege, student in a university, school, and business especially for receiving direct incentive specials coupons etc. . . . and for a full nav4emergency protection.

The proposed system allows the user choose between participating and receiving incentive, special sales, coupons and local content tailor to the user preference, all for free, or they can choose not to participate and pay a small fee for the service and the software. In any case the user's privacy is still protected to the highest-level compare to any normal daily use of the Internet!

There is also a great benefit to the user participating—they can have full emergency notification directly to their phone and in an emergency they can be directed by the emergency procedure in the area/building/mall/store and navigate to the exit route, even if the cellular network fails due to the high volume of traffic occurring in an emergency situation.

In the disclosed method, there is no detector or tracking for the user, the user themselves engage the scanning and detecting method to find the beacons in the area.

The disclosed secure encoding key method can be used to secure other applications or processing where the privacy and security are needed most in a near field applications.

Other than that, an application for the benefit of the user, from parking to sales specials to indoor navigation, to be informed and notified in case of emergency and directed to the exit route to safety.

The disclosed method can be attractive not only for shopping malls, department stores, or downtown strips but also to high rise buildings, commercial buildings, airports, ports, universities, schools, museums, amusements parks, trains, subways, and hotels resorts and even cruise ships.

It can also be attractive to search engines, advertising companies, cellular phone operators, manufactures, GPS companies, mapping, local businesses, local advertising. The disclosed method can give the LBS a new meaning—the business model that's made easy.

A facet of behavioral targeting has been around for a while but mostly on-line but it's been gaining traction among ad agencies retargeting program is now a key planning consideration for its advertisers.

Why? The primary reason is because retargeting is a powerful means to bring lift to ad campaign results, generating higher conversion rates and lowering acquisition costs. You can't get much more effective than targeting a person who has shown interest in a product but didn't buy with a related ad that then gets him to buy, right?

The legacy of LBS technologies that marketers today rely on generally fail to tap the unique opportunities of local advertising market estimates to be over $150 Billion in US alone, people are spending more than 90% of their time indoors, but with no clear technology to provide indoor navigation and not clear business model, The advertisers, the business are disillusioned with the promise of LBS but are still longing for a solution that properly addresses the significant audience represented by the explosion of cell phones use and the availability of content.

It is believed that the disclosed innovation technology and business model can provide the next generation method for the LBS market to tap into the huge market opportunities.

Where the disclosed invention is unique:

The disclosed innovation is based upon Bluetooth and Wi-Fi protocols, integrated into more than 90% of the new cell phones. As explained before, the disclosed method represents more accuracy and practical deployment then existing outdoor methods.

The disclosed method is about infrastructure that enable navigation and LBS applications without help of GPS or cell ID, and more precise—indoor navigation, the disclosed method is not for tracking or locating user, it's about providing an easy deployment infrastructure in a building/area/mall store a known setup of tags/beacons that are installed in known positions in the area and serve as LBS and navigation infrastructure and a triggering mechanism to allow delivery of desired content to the right people at the right time.

The navigation can be for a real place like a store, a restroom, etc., or for sales, coupons, specials in an area/store, etc.

The navigation method is the same as a current GPS method, on a map of the area/store/mall.

The disclosed method represents a very unique way of locating the exact location, in the disclosed method, the user scans the area for a known list of beacons/tags. There are no detectors and no scanning for user device/phone, the user control the scanning of the area for the known tags, in reality there is no communication to be establish at all, the user device scan the area for a known tags and the determination of the location done by able to scan tag/beacon from the list—meaning establish proximity to the tag/beacon and accuracy less then 5 m and even below 1 m.

Add is the special indoor application design especially for indoor/store/mall shoppers from finding where the user park his car to find/search of directory to an emergency alarming and notification.

More over all the disclosed innovation are not depend on cell communication or Internet and for the navigation method there is no need for central' system nor expensive infrastructure, in fact the user device-cell phone as well with the infrastructure tags/beacons have battery built in and can work even if the electricity is out, a very important in emergency situations.

More over the disclosed sale sense marketing method comprising a unique way of delivering local content, advertising, coupons, special sales etc. pin point according to user profile preference input by the user and encode as a secure key into the user Bluetooth/Wi-Fi naming to be decode by delivery entity that will decode the user profile/preference and with additional record of user behavioral activity will provide simple and secure method for—targeting user for LBS services and other services like near field communication.

The user profile is not a text or file that reside in the user device it is a key encode into the user Bluetooth/Wi-Fi naming and can recognize only by the deliver entity that can decode the user key (like a VIN#). It is not the device profile and not the user device profile.

The disclosed innovation will enable a full line of indoor navigation application especially to places/area where the GPS can't be provided and more accuracy needed.

BRIEF DESCRIPTION OF THE DRAWINGS

A better understanding of the present invention may be obtained by reference to the accompanying drawings, which should be considered in conjunction with the detailed description, all in accordance with the present invention.

DESCRIPTION OF THE PREFERRED EMBODIMENT

Figure 1:
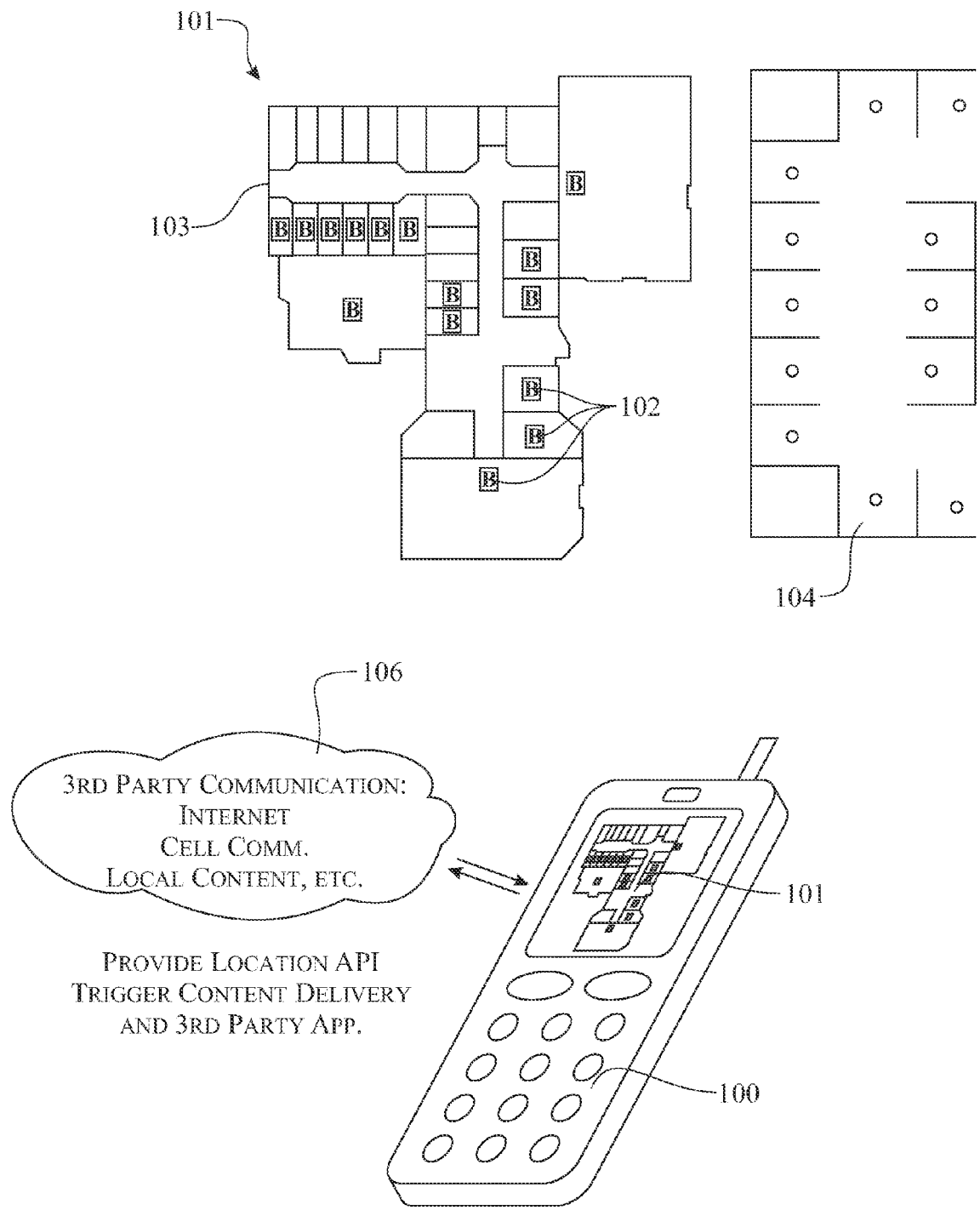
FIG. 1 illustrates an implementation of tags/beacons as an indoor infrastructure for example, in a mall application.

In all the figures of the drawings, sub-, features and integral parts that correspond to one another bear the same reference symbol.

Referring now to the drawings in detail and first particularly to FIGS. 1-12 thereof.

FIG. 1 is illustrates the implementation of the infrastructure of the tags/beacons in a mall application according to an embodiment of the present invention, each of the Bluetooth/Wi-Fi tags/beacons (102) contain the name of the waypoint (Macy's for example) and the location of the tags/beacons are known and load in a list with the map of the facility (101) into the user mobile device (100), the list allow matching of the tags/beacons signal (names) (102) to the known list loaded with the map (101) to determine the proximity to the tag/beacon providing accuracy to less than 1 m the tags/beacons (102) can be install in the area in each location designated as way point store/rest room/special sales special location etc. The user can load the map (101) at the entrance (103) or pre load from the Internet or other lbs or mapping providers, the beacons can be installed also in the parking area (104) and with additional sensor to determine existence of the parking car in the parking area can provide the user with parking navigation to empty parking, the user mobile phone (100) with loaded local map of the facility (101) that contain the local area list of a known Wi-Fi or Bluetooth beacons/tags (102) in the area, the mobile phone will use a special indoor navigation application that will allow scanning the exact list of the area RF Wi-Fi or Bluetooth beacons/tags and determine the exact location of the mobile user by proximity to the finding beacons/tag, the tags/beacons (102) broadcast there ID that can be the exact name and the exact location name known location on the map, the mobile device (100) with the tag/beacon name or ID will trigger content delivery from 3rd party over the Internet or cellular or a cloud (104) such providers will now will know the user location and can provide him with the right content additional to the mapping like advertising, sales offer, special deals coupons or other information all trigger by the location determination done by the infrastructure of the tags/beacons, more over it will allow a real time creating of smart shoppers power and real time protected consumer/student/guest/employee environment where a real-time group of real time physically existing people can share like a real "social networking" environment for application. Like "face book" like or create private social environment to include all the exact people in the area/building/cruise ship/mall/store/school close proximity and people that are attached to one of the known list of the local area RF beacons/tags, especially for consumers that can be know now who is in the area and no need for the "poor man" navigation method of the "check-in" to tell the store/consumers that you are here. Now they can know and there is benefit to the user/guest and to the mall/store/hotel/building area owner, the setup of real time physical group can serve as add-on to exiting social network part of (106).

Figure 2:
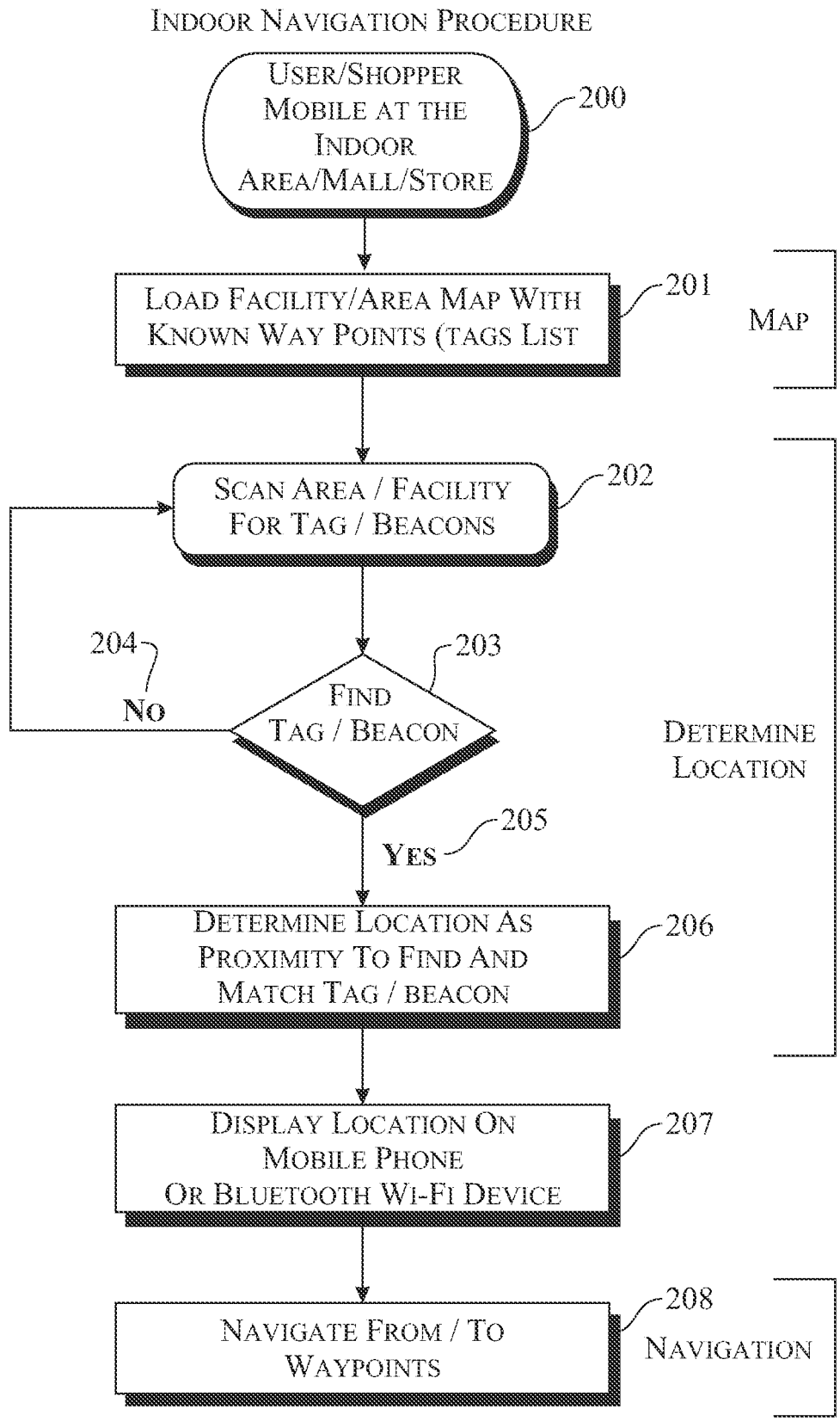
FIG. 2 is a drawing of the indoor navigation procedure.

FIG. 2 is a flowchart illustrating of the indoor navigation enable by the infrastructure according to an embodiment of the present invention. Referring to FIG. 2, the user with cell phone (200) approach a facility/area with a load facility/area map (201) with a known list of waypoints represented by Bluetooth/Wi-Fi tags installed in the facility/area in a known places. The user mobile phone navigation application will can (202) the area/facility for the known list of the Bluetooth/Wi-Fi tags/beacons, if tags/beacons was find (203) and (505) then the location of the user is determine as proximity to the find and match tag/beacon from the list (206) scanning is continue if no tags (204) was found, when found the location is displayed on the loaded map over the mobile phone or Bluetooth/Wi-Fi device (207) and have the ability to navigate (208) between way points Accuracy is below 1 m and in case of approaching signal from more than one beacon/tags a triangulation method will perform to determine the exact location. The method gives the user the control and the privacy as his cell phone device is the scanner and it scans the area. In reality and the unique method there is no established communication at all as the scan reveille the tags/beacons name (store or exact location address/name) or waypoint location like Macy's. Without to establish any communication between the tags/beacons and the cellular phones and there is no need for Internet, GPS, central system or even cellular communication to perform the navigation making it a unique approach compare to other indoor navigation methods.

Figure 3:
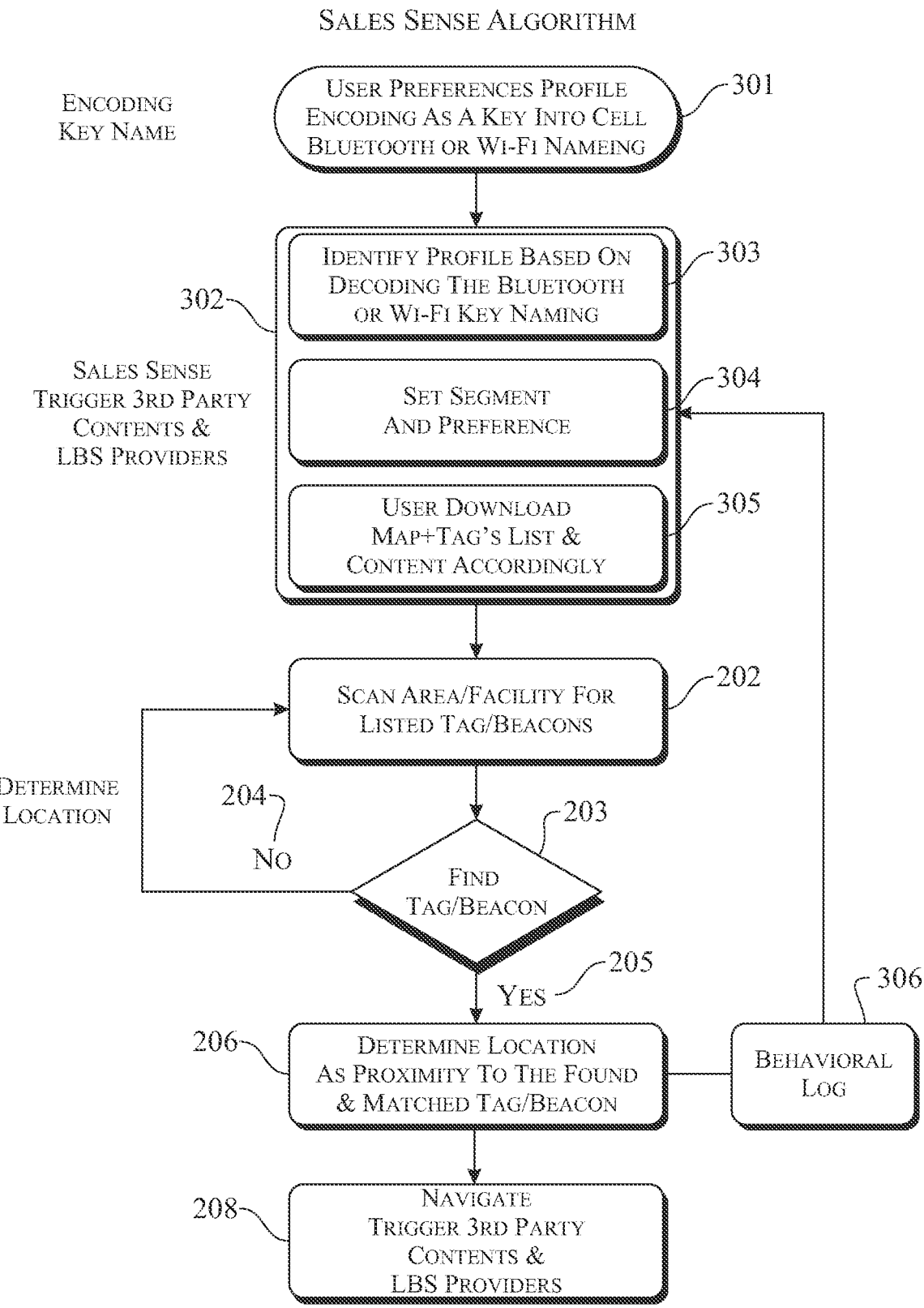
FIG. 3 is drawing of the sales sense marketing option algorithm.

FIG. 3 is a flowchart illustrating of the sales sense marketing option algorithm according to an embodiment of the present invention, referring to FIG. 3, in the sales sense option method the user input his profile preference in a blue umbrella Bluetooth/Wi-Fi application, the profile can contain gender, age range and sales preference of the user, the information will be encode into the Bluetooth naming of the cellular phone as a key (301), like a car VIN #, to provide maximum privacy and secure to the user there is no personal ID nor cell number or any information that can reveille the ID of the user just information that can set the user preference and sales segments without compromise the user privacy, when the user approach the area/facility with the associated infrastructure of the tags/beacons trigger content delivery/mappings/ad/coupons/specials (302) that provide the user with the mapping of the facility/area will determine and identify (303) the user profile based on decoding the Bluetooth/Wi-Fi key naming (301) and set the sales segment and preference (304) and accordingly will provide the user with the area/facility mapping and the local content according to the user profile/preference, providing direct and targeted method of delivering local content advertising coupons special sales etc. According to the user location determine by scanning the facility/area (202) for the known list of tags/beacons and determine the location according to the proximity (206) to the find tags/beacons, the log of the movements around the facility will provide behavioral sales method to be add to (304) the sales segment and preference, in a unique part of the disclosed innovation method, not only the disclosed innovation can provide direct content according to user location also can direct and navigate the user (208) how to reach the place of the special sales, coupons providing a complete and unique approach to indoor navigation where the user own input of profile and preference with the user behavioral, sales habits can be use together for the user and the store/facility benefit to provide the user with direct local content and even navigate him to the places even to the store location isle where the sale special coupons take place and all without compromising the user privacy.

Figure 4:
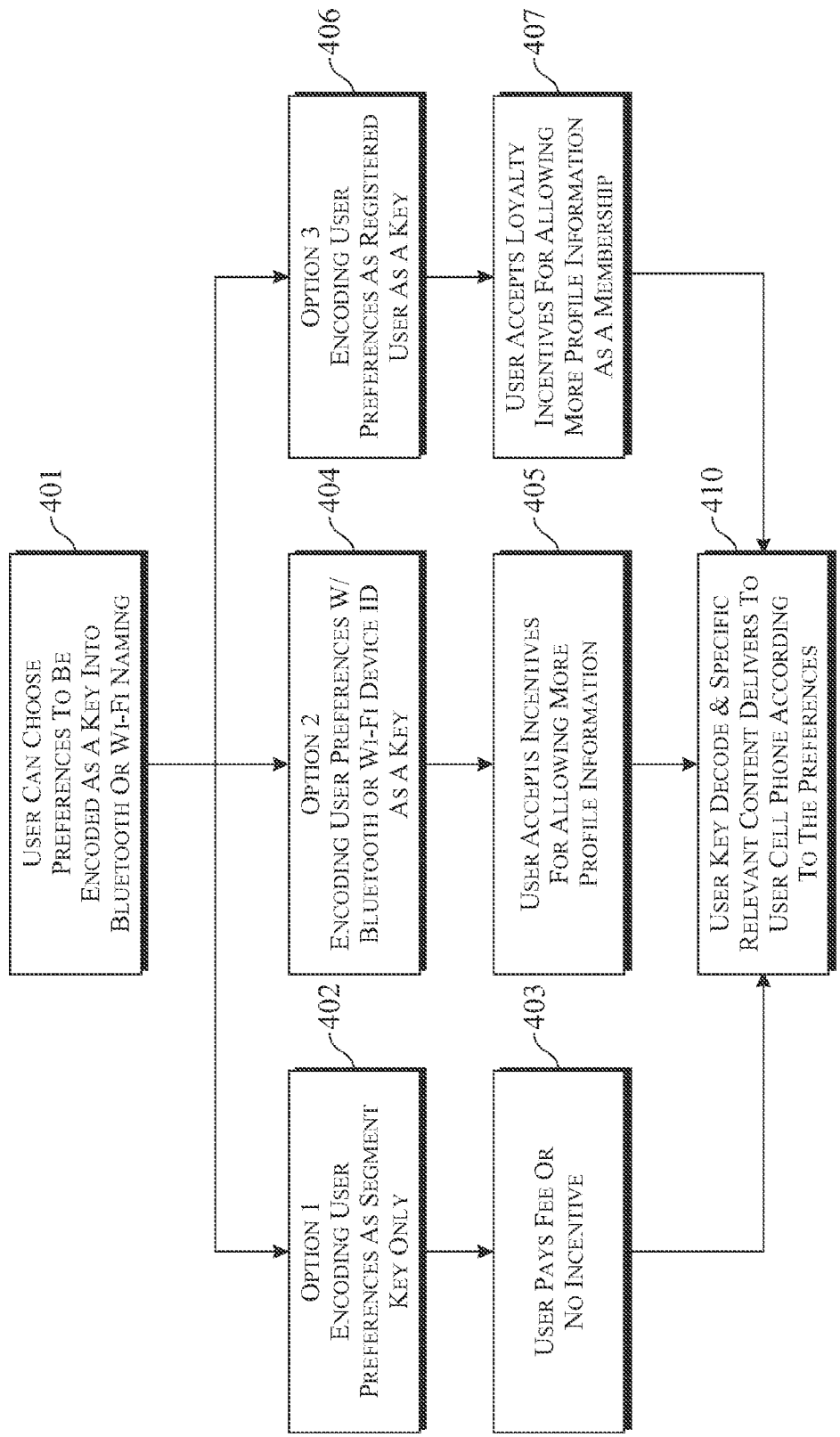
FIG. 4 show the drawing of sales sense user preferences/profile options.

FIG. 4 is a flowchart illustrating of sales sense marketing option-user preferences/profile options according to an embodiment of the present invention referring to FIG. 4, the user can choose preference to be encode as a key into the Bluetooth/Wi-Fi (401) the options represent ability of the user to become and be benefit of member like of the facility/store/mall by providing additional profile/preference that can assist the area/facility store mall owner to provide the user with more of direct and targeted contents according to the user preference but under user control and all with great attentions to the user privacy, option 1 (402) is part of the application where the user preference encode as a key into the Wi-Fi or Bluetooth naming in a method that only the sales segment can be reveille and the user may pay fee for the software or receive no incentive (403), the other option, option 2 (404) the user provide preference with part of the user Bluetooth/Wi-Fi device ID encoding as a key, the user will accepts incentive (405) for allowing more profile information the incentive can be in a special sales, coupons etc. Again, no personal information are exposes and the user is in complete control over the information or the software at all time option 3 (406) is when the user would like to be register us a member of the store/mall facility to get the full benefit and to be recognize (again not personal information or any ID are exposes) for example when enter the store/mall/facility with his carryon profile/preference, the user will accepts loyalty incentive for allowing more profile information as a membership (407), in all the options the user key will be decode at the area/facility and specific relevant content will be deliver to the user cell phone according to the user preference/profile (410) all under user control and without comprising user privacy.

Figure 5:
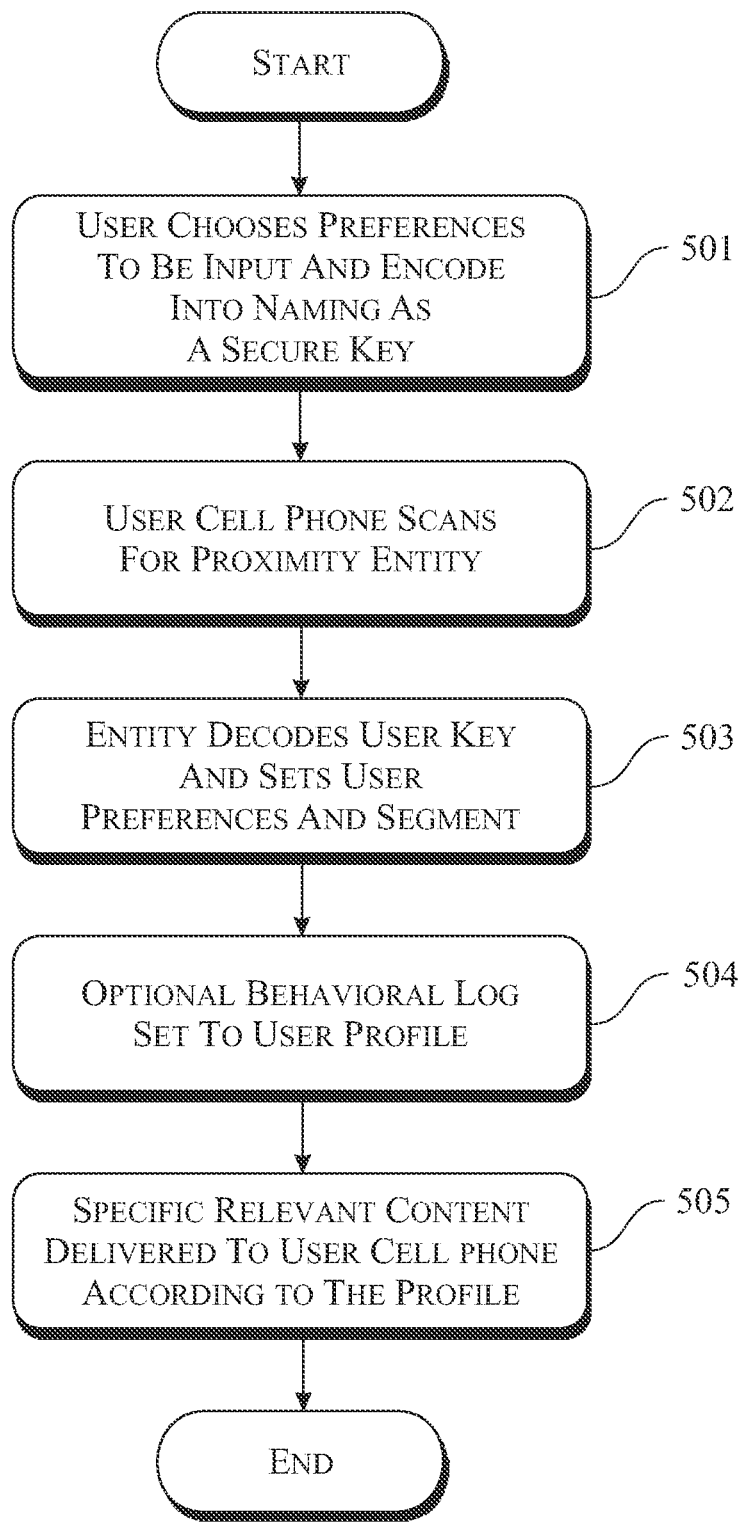
FIG. 5 is a drawing of secure user preferences/profile marketing option.

FIG. 5 is a flowchart illustrating of option secure user preferences/profile according to an embodiment of the present invention, the user chose preference/profile to be input and encode into Bluetooth/Wi-Fi naming as a secure key (501), the user mobile phone with special navigation application scan the proximity area (502), in the area/facility where the user can trigger receiving the area map or use pre load before access the area, the area/facility map the decoding key will be process (503) and will set user preference and sales segments, an optional behavioral log (504) will be add to (503) to provide profile, preference and behavioral information about the user all under the user control and without reveille the user ID or effect his privacy, it is like bringing the web sales into the reality and give the user ability to receive a direct local content according to his preference that will be deliver (505) to his mobile phone according to his profile/preference, the content/ad or sales/deals offer are deliver by 3rd party using communication method Internet or cellular that trigger by the associated infrastructure tags/beacons that determine the location and being pick by the 3rd party for LBS application.

Figure 6:
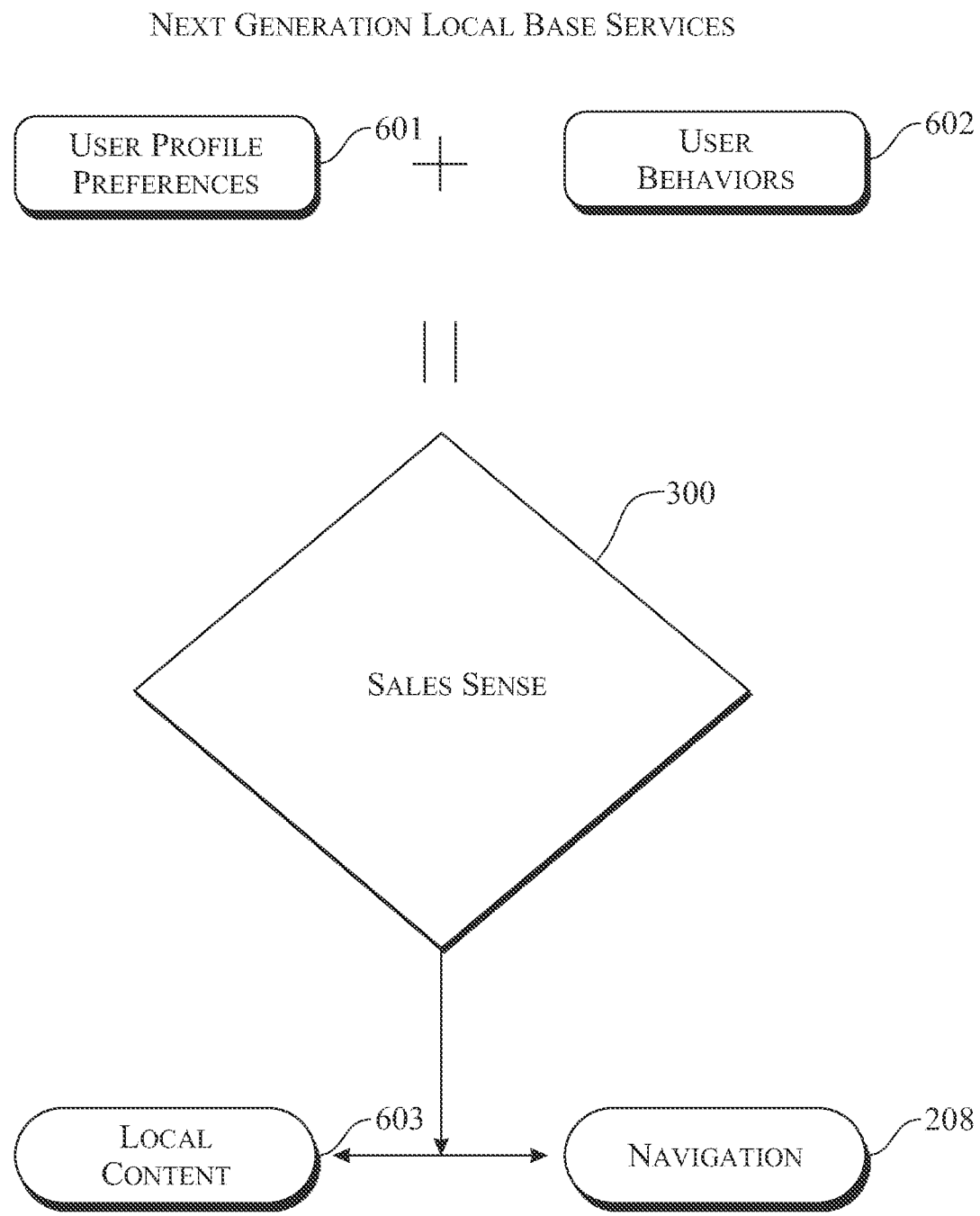
FIG. 6 is a drawing of the next generation local base services (LBS).

FIG. 6 is a flowchart illustrating of the next generation local base services (LBS) according to an embodiment of the present invention referring to FIG. 6, in the proposed business method, the system brings together the user input of profile/preference (601) plus the user behaviors (602) in the area/facility/store mall to be integrated into the proposed sales sense marketing method (300) where a direct and targeted local content (603), advertising, special sales, coupons etc. can be trigger for pin point deliver to the user according to (601) user preference and (602) user behaviors and direct the user and navigate him (208) to the store area isle where the sales special coupons are, again, the associated infrastructure will provide the trigger mechanism to allow the precise delivery of the right content to the right people at the right time.

Figure 7:
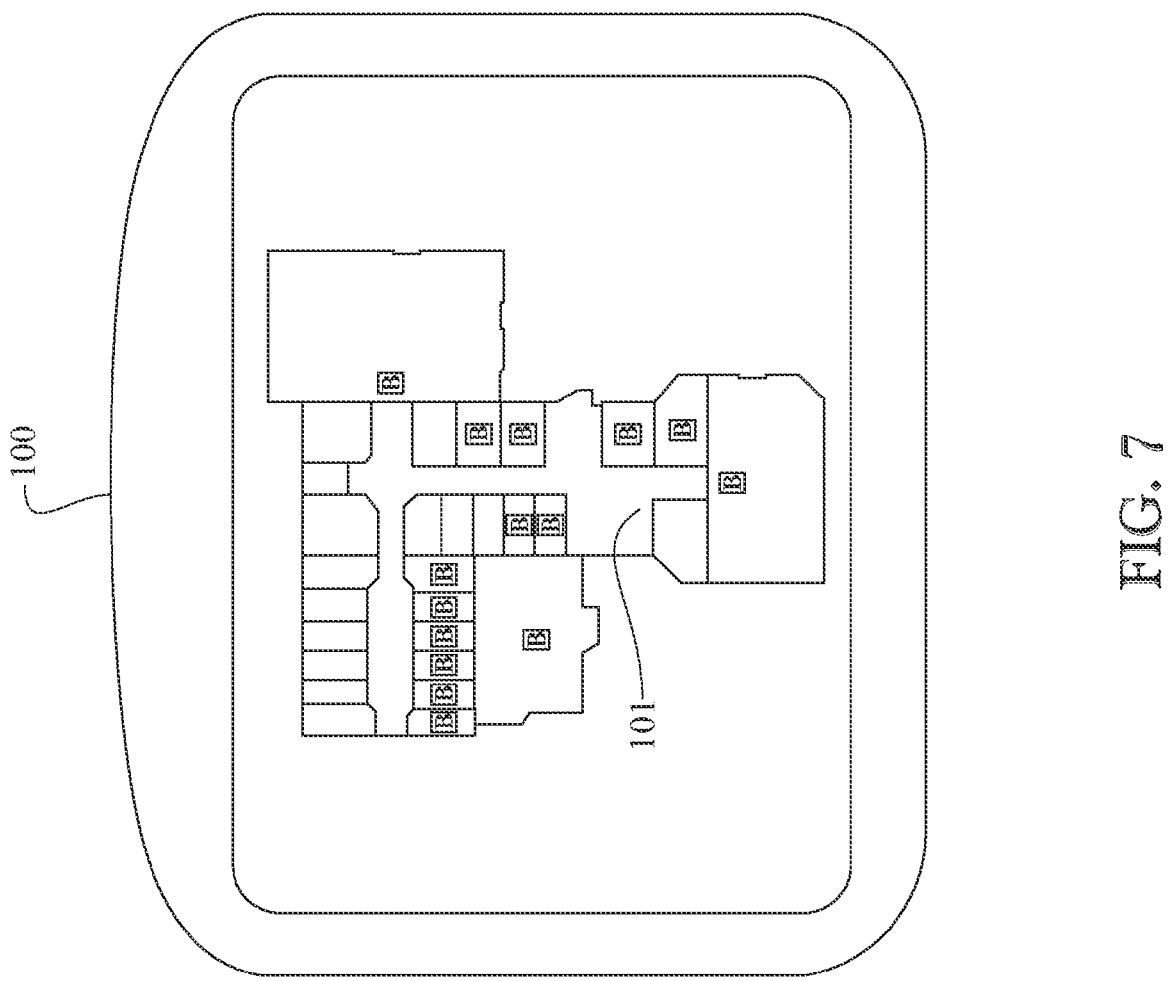
FIG. 7 illustrates the user mobile phone with the indoor mapping as part of the mall applications.

FIG. 7 is illustrates the user mobile phone with the indoor mapping as part of the mall applications according to an embodiment of the present invention where the user mobile phone (100) will loaded of the area/facility/building and special indoor navigation application to be ready to explorer the indoor facility.

Figure 8:
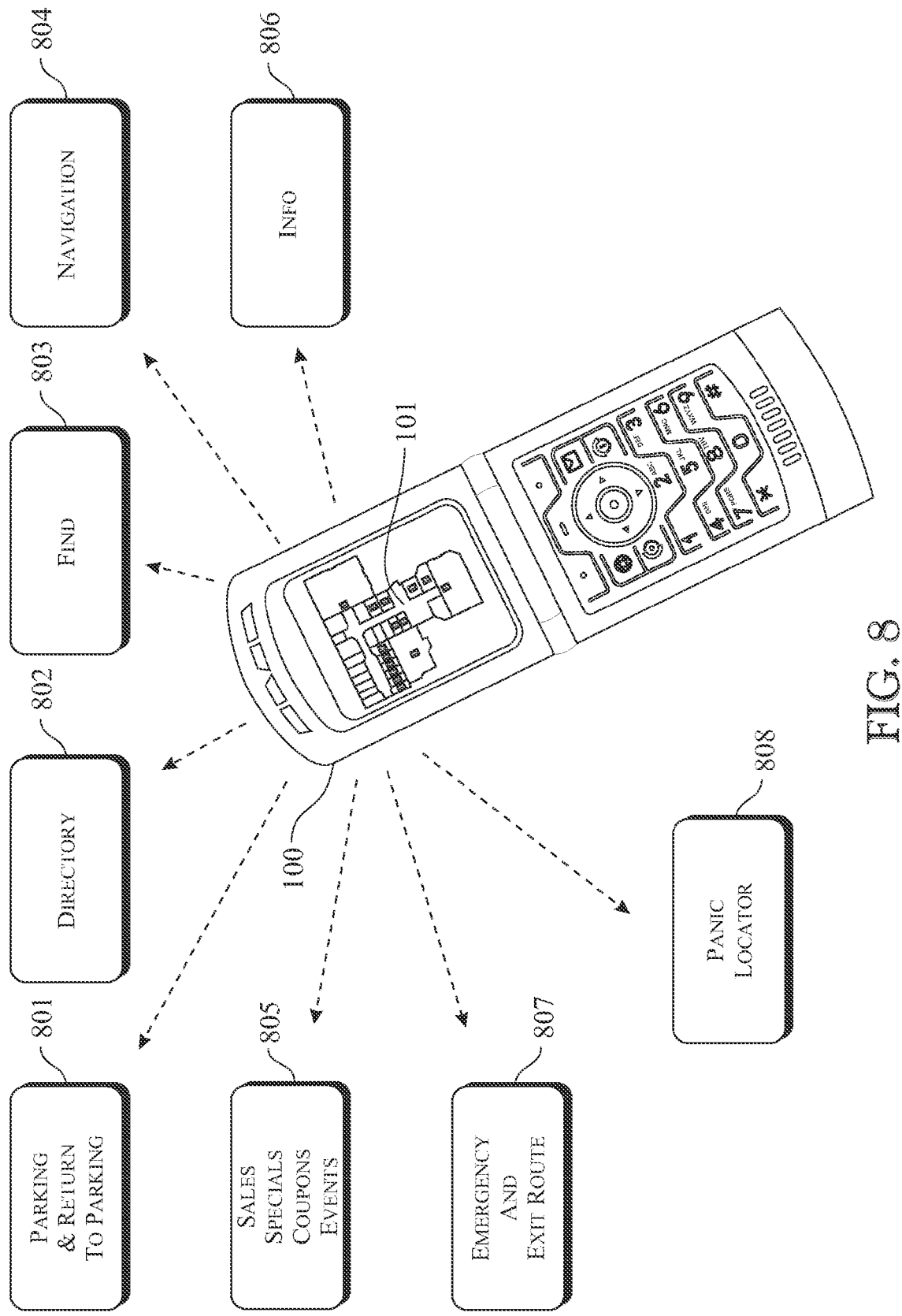
FIG. 8 is illustrates the indoor mall/store LBS application that can be enable by the associated infrastructure.

FIG. 8 is illustrates the possible of indoor mall/store application that can be enable by using the associated infrastructure for indoor navigation according to an embodiment of the present invention referring to FIG. 8, the disclosed innovation provide a complete indoor application to the benefit of the user in a way it is like taking the directory stand and indoor navigation to the user mobile phone (100), starting with ability to find parking (801) and the ability to find where the car parked (return2parking method) to the mall/store directory isle products (802) with ability to search and find (803) and navigate between waypoints indoor (804) to store and even to sales, specials coupons and special sales events (805) and important information about the area/facility like rest rooms key area playground kids area and in emergency event provide the user with emergency information alarming and notification directly to the user mobile phone even if other communication method like cellular communication will fail during the emergency the user can be notify and direct to the safety exit via the included nav4emergency method as part of the indoor application (807) also in case of emergency the user can punch on secure panic button to ask to be located immediately by the authorities. (808).

Figure 9:
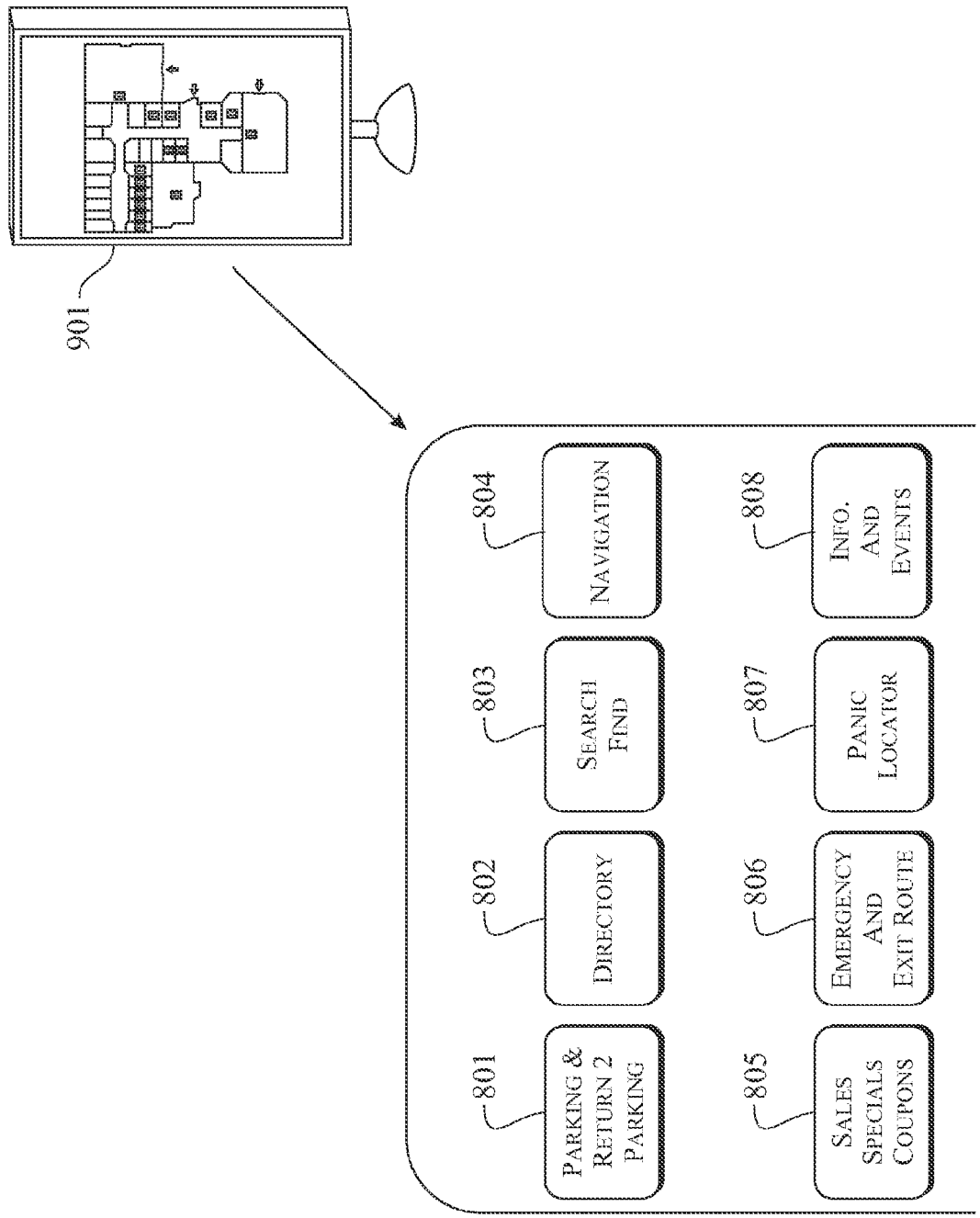
FIG. 9 is illustrates the mall directory as part of the mall applications.

FIG. 9 is illustrates the mall directory as part of the option of mall applications according to an embodiment of the present invention referring to FIG. 9, it's illustrates the indoor application in the user mobile phone as a buttons each represent the indoor programs to be available describe in FIG. 8, from (801) parking and return 2 parking, (802) the directory, (803) the search and find (804) represent navigation request between the known way points, (805) the sales, specials, coupons, (806) will provide the user with emergency and notification and exit route and emergency procedure that so important to building/area in case of emergency (9/11, Virginia tech etc.) To a secure panic button (807) that can trigger locate the user (like 911 call) in the area by the security personal and (808) button provides information and event info. About the area/facility/mall/store.

Figure 10:
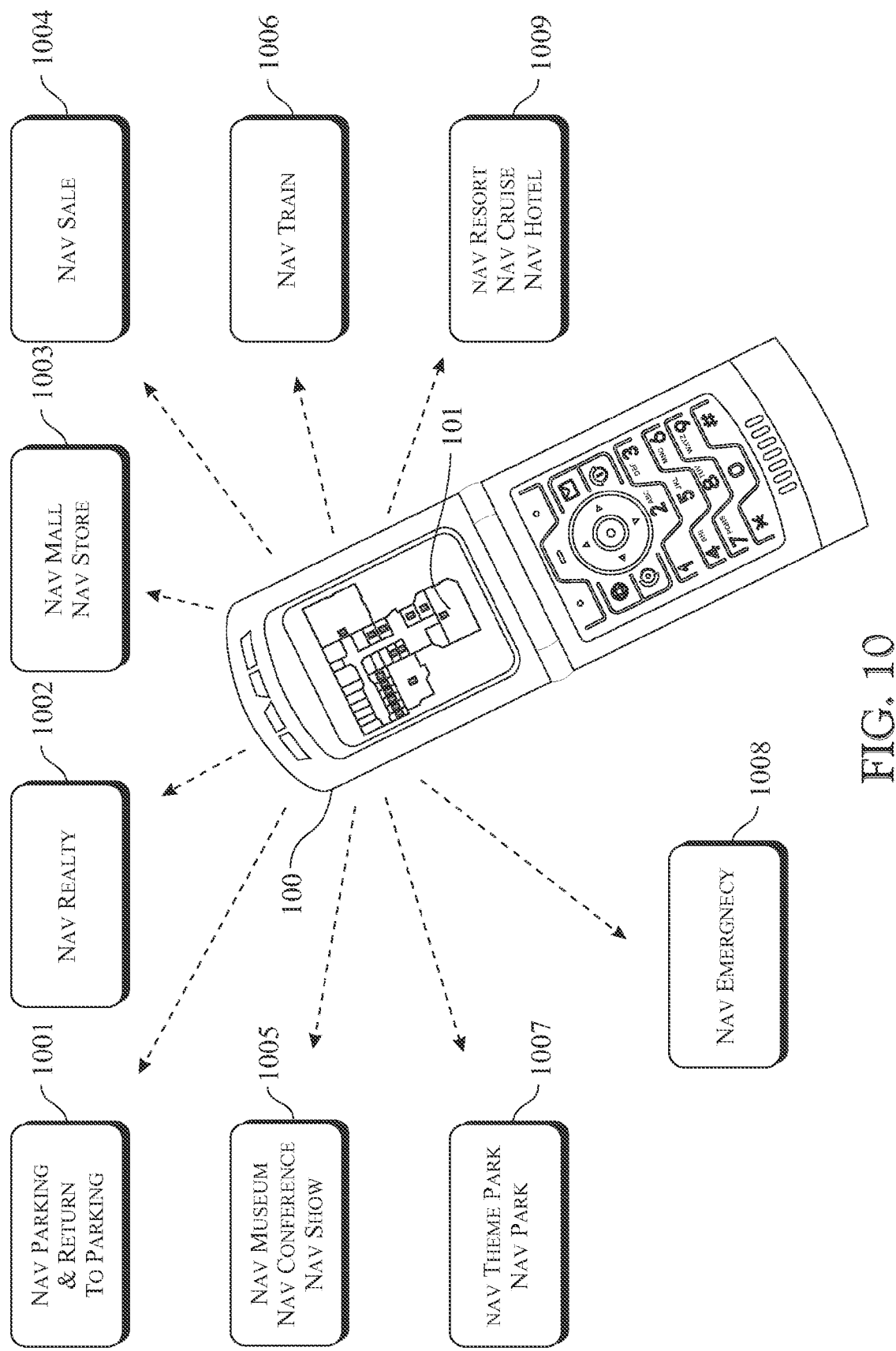
FIG. 10 is illustrates the indoor or LBS application enable by the infrastructure.

FIG. 10 is illustrates the indoor or LBS application that can be use and be able to provide the users by using the associated indoor infrastructure according to an embodiment of the present invention, referring to FIG. 10, it's illustrates the indoor applications that can be use from nay parking to provide parking information in a parking garage or at the mall parking area to provide the user with direct navigation to empty parking (1001) to provide the user with information where he parked his car in the mall/garage return 2 parking method (1001), To navrealty (1002) where the user can received real estate content trigger by their exact location determine by the associated infrastructure Bluetooth/Wi-Fi tags/beacons and navigation method of the local area real estate information directly to the user mobile phone or device, to navmall/store (1003) that describe in more information in this patent applications to naysale (1004) where the user can be directed to the special, sales, coupons, and the like, the same method can be use in a museum conference show (1005) where the tags/beacons installed in a know places in the show conference museum, and the same method can be used in amusements parks such as Disneyland, Walt Disney World, Universal Studios, Six Flags, Sea World, and the like, where the user can be provided with navigation in an area where GPS navigation is inaccurate unable to provide location support and provide with navigation information even tickets and fast pass with accuracy less then 1 m directly to the user mobile device and all without requirement of Internet bandwidth or even cellular communications or GPS, and in emergency event provide the critical information that each user need of emergency procedure, emergency map and how to go to safety (1008) according to his exact location, the same method can be provided in subway, underground or train bus mass transit where the user can be provided with information directly to his mobile phone trigger by the infrastructure of the beacons/tags installed in the route to give the user complete navigation on the map of the train/subway mass transit directly to the user mobile phone/device without need for bandwidth or Internet or cell communication (1006) all what he need is Bluetooth or Wi-Fi, same infrastructure of Wi-Fi routers/beacons or blue tooth beacons/tags can be install in a resort/hotel or even cruise ship and enable an LBS indoor applications from navigation to guidance to events information and emergency procedure and information according to the guest location.

Figure 11:
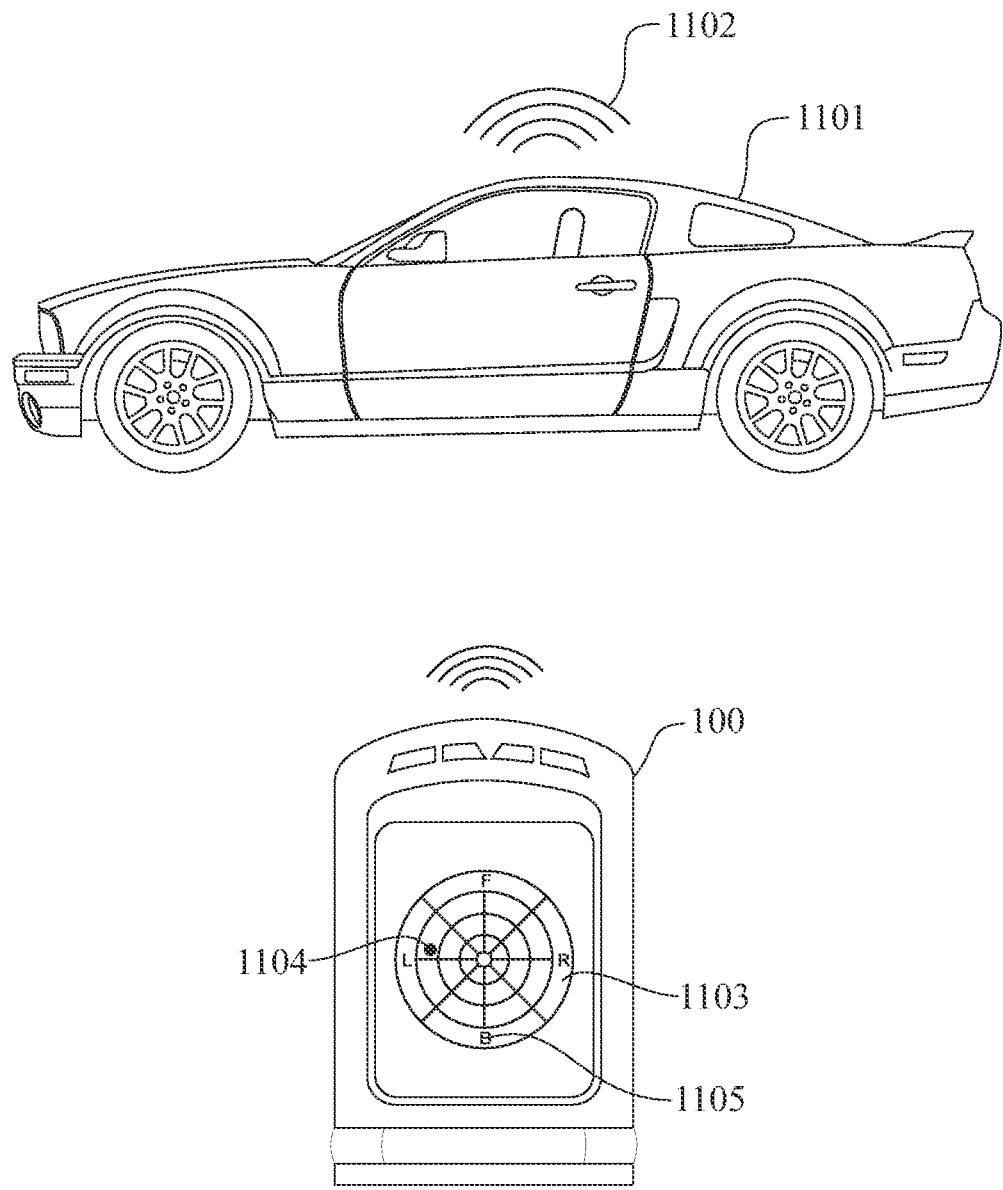
FIG. 11 show illustrates of the return2parking method.

FIG. 11 is illustrates of the return 2 parking method according to an embodiment of the present invention referring to FIG. 11, a long range Bluetooth or Wi-Fi with set ID with range over 1000 m will be install inside the car (1101) as a separate device (1100) or part of the car by manufacture and will broadcast the car ID (VIN#) or special ID set by the car owner or the car manufacture (1102) built in the car to provide the signal broadcasting of the car ID or the VIN number, that car ID will be scan by the return2parking application to the user mobile phone (100) and the scanning result will be display inside a circle represent range (1103) and (1104) where each circle represent the range to the car where (1105) represent the direction to the parked car, the user can find his parking car inside a garage outside an area to the accuracy of less than 1 m directly to his mobile phone (100) without need for Internet bandwidth or even Internet or cellular communication.

Figure 12:
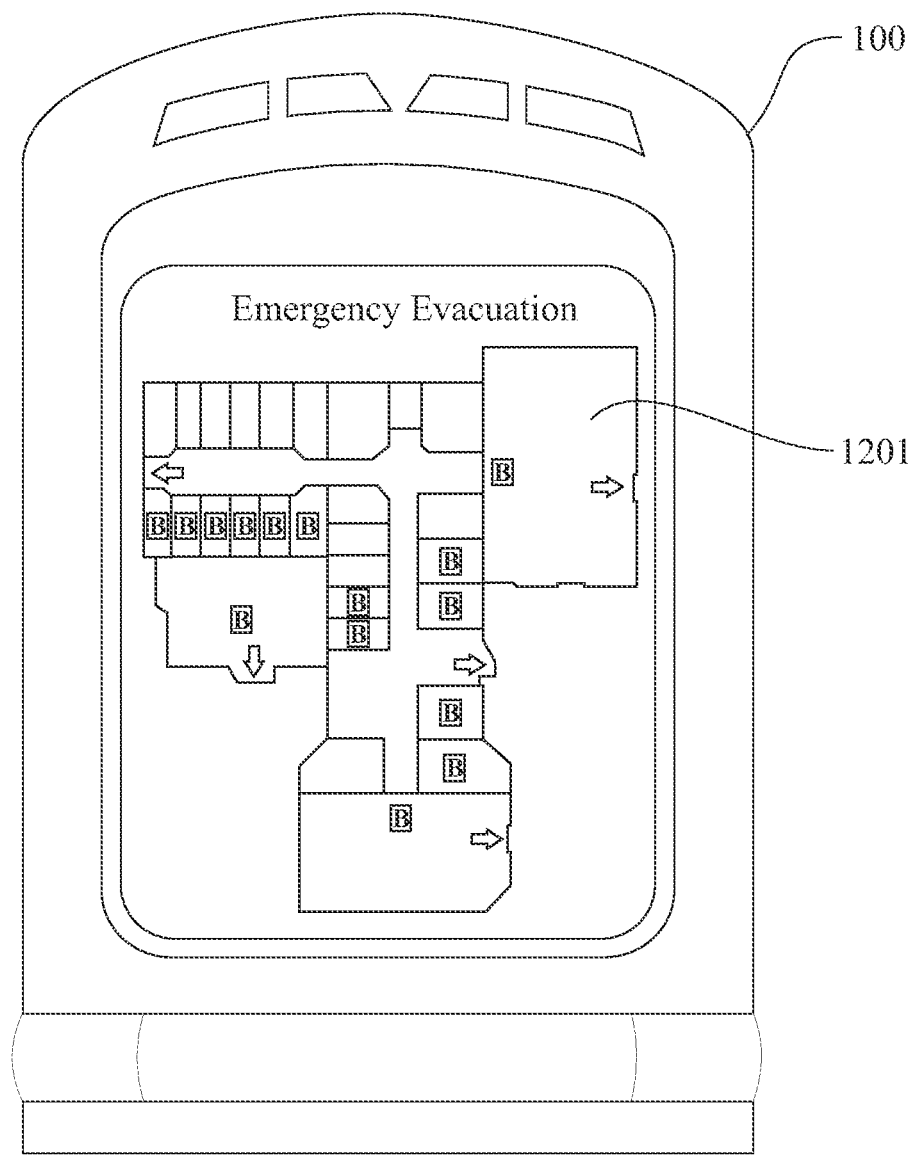
FIG. 12 show illustrates of the nav4emergency.

FIG. 12 is illustrates of the nav4emergency according to an embodiment of the present invention, referring to FIG. 12, show illustrated of part of nav4mergency where the emergency maps and emergency procedure that unique to each facility/building/place/mall/store/company/floor etc. can be display as part of the nav4emergency on the user cell phone (100) as part of the mapping or emergency map and procedure to show the exit and emergency route in case of emergency (1201), the same program can provide alarming and notification a very important and critical information for the user anywhere, the information will be provide to the user even if the emergency event the cellular or other communication method will be down or not available as common to any emergency event like 9/11 or Virginia tech in the disclosed innovation all the critical information from emergency procedure to emergency maps and navigation to the exit to safety are done without need for Internet bandwidth or cellular communications at all more over it will provide precise emergency information and procedure according to the exact user location, instead of using the emergency procedure as of today—a paper on a wall, it is suggested moving it to the digital era where and when it can reside on the employee/guest/student/traveler/user mobile phone and being trigger for his right location and the right emergency information/mapping according to his exact location determine by the associated infrastructure.

Figure 13:
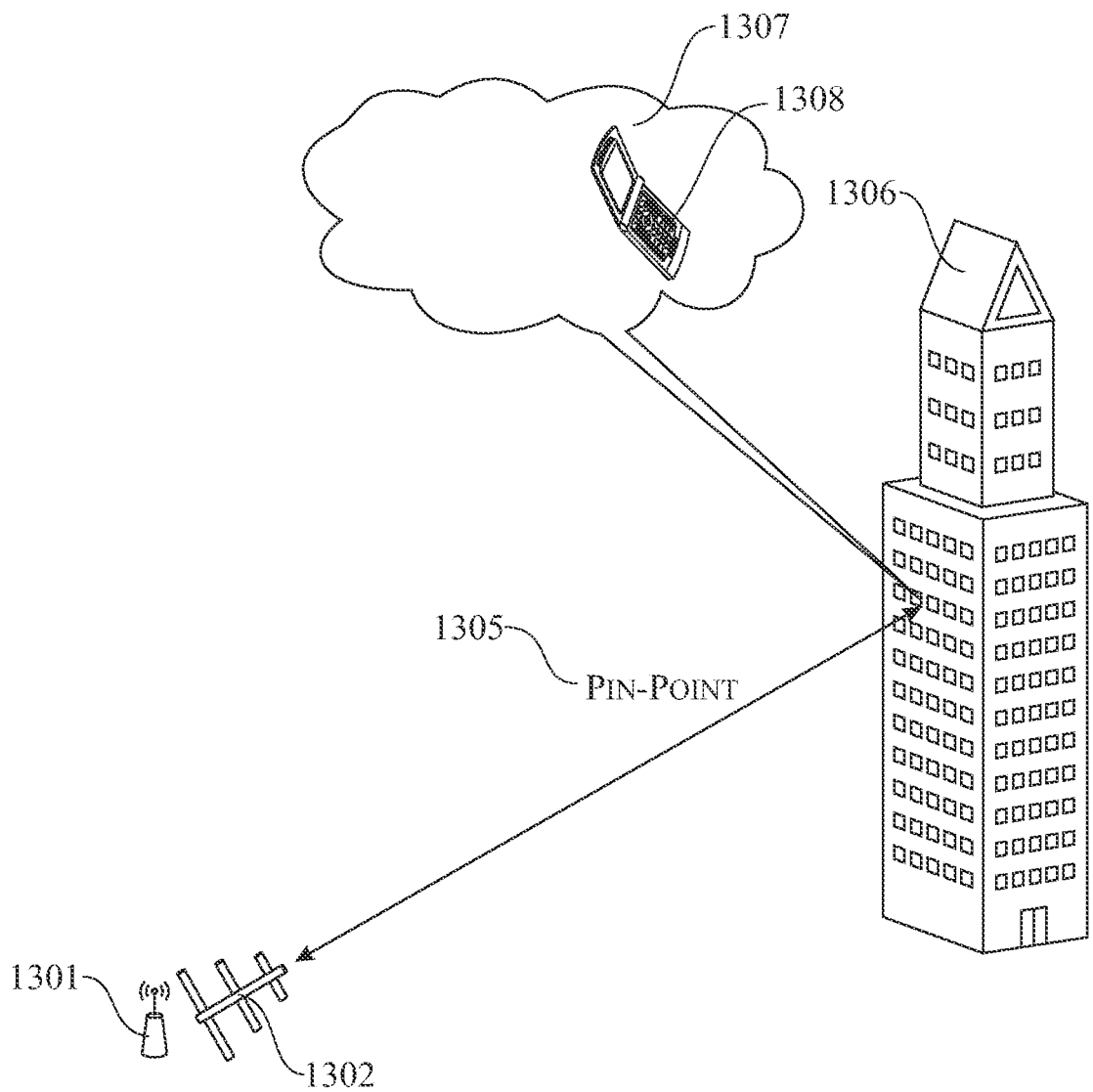
FIG. 13 show illustrated of scan4life

FIG. 13 is illustrates of the scan4life emergency scanning application according to an embodiment of the present invention, referring to FIG. 13, show illustrated of part of scan4life unique method, that allow the user with mobile device to be track (only in emergency) in a location using the unique method where in the drawing example the user (1308) mobile device with emergency/panic button or in a case of emergency where the user are in an emergency situation inside a building (1306) and there is no cellular or other communication, the system can use a long range Bluetooth or Wi-Fi yagi antenna (1302) to scan the area/facility/building/mall/store from long range over 1000 m even from outside of the building and pinpoint (1305) the exact location of the user.

What is claimed is:

1. A method of deploying an infrastructure enabling indoor and outdoor navigation and local based services (LBS) in a facility area needing precise location accuracy, the method comprises steps of:
   a. installing a plurality of RF beacons within the facility area, each RF beacon being installed in a known position within the area/facility, each RF beacon representing an associated waypoint, collectively, the plurality of RF beacons providing the infrastructure for indoor and outdoor navigation and LBS applications;
   b. downloading a map of the facility area into a mobile device, wherein the facility area map includes an RF beacon location index comprising a known list of an identifier (ID) of each RF beacon and an associated location of each respective RF beacon in the facility area;

c. determining a current location of the mobile device from beacon signals received from RF beacons located in a proximity of the mobile device;

d. displaying the position on the facility area map on the mobile device display;

e. navigating between waypoints associated with each RF beacon by using the facility area map; and f. initiating receipt of local content, LBS services, and applications according to the current determined by at least one of: the location of the mobile device, the RF beacon identifier (ID), and pre define preference encoded into the mobile device, whereby the content is deliver by a $3^{rd}$ party over at least one of an Internet and cellular communication network, thus ensuring the system delivers appropriate content associated with a proximity of the mobile device to the associated RF beacon, wherein the RF beacon transmits the beacon signal in accordance with at least one of a Bluetooth protocol and a Wi-Fi protocol.

2. A method of personalizing delivery of content items according to claim 1 comprising:

a. determining the current location of the mobile device by at least one of:
decoding information received from each RF beacon in a proximity of the mobile device to determine the RF beacon identifier and utilizing the RF beacon identifier in conjunction with the RF beacon location index, utilizing a signal strength of the beacon signal, and utilizing triangulation of multiple received RF beacon signals;

b. decoding, storing, and utilizing a /profile key to determine marketing segments and behavior of a user;

c. determining content based upon the current location of the mobile device and information provided through the profile key and delivering content to the user; and e. receiving navigation to a selected waypoint on the facility area map, wherein the selected waypoint is associated with the content, and the navigation, selected waypoint, and facility area map are displayed on a display of the mobile device.

3. The method according to claim 1, further comprising a step of displaying the information over a background image, wherein said background image is at least one of: a facility area map, a GPS map, and a floor plan downloaded to the mobile device said background image contains known waypoints associated with each known RF beacon.

4. The method according to claim 1, further comprising a step of initiating at least one application function associated with the user of a Bluetooth enable device with a special indoor local base services application said the application may include the following elements:

a. a map and indoor navigation feature comprising a step of navigating from one waypoint to a second waypoint on the facility area map, wherein the facility area map is one of a local mall map and a local merchant map, and wherein the one of the local mall map and the local merchant map is one of pre-downloaded from the Internet prior to arrival at the facility area and downloaded at the facility area;

b. a directory feature comprising a directory of merchants associated with facility area map, wherein the directory is stored on the mobile device and introduces at least one of:
a step of displaying the directory,
a step of searching the directory, and
a step of displaying information associated with each merchant at a location on the facility area map depicting each merchants actual location;

a. a search and find feature comprising steps of searching for at least one of a merchant, a location, an item allow search and find store/place/item products that are on the said directory and the list of waypoints/ tags/beacons include on the load map;

c. a sales and specials feature comprising steps of providing marketing incentives including discounts, sales, and coupons, and at least one of:
presenting marketing incentives to the user on the display of the mobile device, and
directing the user to a location of an item within the merchant's store that is associated with the marketing incentives, and
selecting an item and directing the user to a location of the selected item within the merchant's store,
wherein the marketing incentives are associated with merchants located proximate the location of the mobile device;

d. a parking feature comprising a step of guiding the user to a vacant parking space;

e. a return to parking feature comprising a step of guiding the user to a location of a parked car;

f. an information feature comprising a step of providing information respective to at least one of an event, a restroom, an automated teller machine (ATM) location, a seating area, a children's playground, a fountain, and a public phone;

f. an emergency feature comprising a step of providing assistance to a user in an emergency condition wherein the assistance includes at least one of:
alerting the user of the emergency condition,
providing navigation instructions to the user to guide the user out of the facility during an emergency condition;

g. Panic—a panic feature comprising a step of emitting an emergency locating signal to identify the location of the mobile device, wherein the emergency locating signal is a cyclically transmitted unidirectional transmission.

5. The method according to claim 1, wherein said step of determining the location of the mobile device is accomplished exclusive of any aid from a global positioning satellite system (GPS).

6. The method according to claim 1, further comprising a step of providing the /mobile phone with application software for navigation, wherein the navigation is displayed upon at least one of the pre-loaded facility area maps and a facility floor plan.

7. The method according to claim 1, further comprising a step of providing navigation and an associated facility area map for navigating within the facility, wherein the facility is selected from a group of facilities comprising: a mall, a department store, a specialty store, a conference, a trade show, an amusement park, a stadium, an arena, a sporting facility, a university, a hospital, a school, a municipal building, a financial institution, a museum, a subway, a cruise ship, a train station, an airport, a down town center, a parking facility, and any place where a global positioning system (GPS) is ineffective for determining a location of the mobile device.

8. The method according to claim 1, further comprising a parking feature, wherein said parking feature comprising at least one of:

a step of identifying available parking spaces and providing navigation to the user to the available parking spaces, and a step of navigating the user to a parking space where the user's car is currently parked.

9. The method according to claim 1, further comprising steps of:

providing navigation within one of: a museum, a conference, and an exhibition center;

receiving at least one of audio and visually presented information to the mobile device, wherein the at least one of audio and visually presented information conveys information associated with one of an event, a conference, and a display at the one of: a museum, a conference, and an exhibition center.

10. The method according to claim 1, further comprising a step of providing navigation to real estate being offered for at least one of sale, rent, and leasing, wherein said real estate is located in an area in a proximity of the location of the mobile device.

11. The method according to claim 1, further comprising a step of providing navigation to the user through the user's mobile device, wherein the navigation includes information associated with an amusement park, wherein the amusement park information includes at least one of:

waypoints associated with exhibit locations,
waypoints associated with attraction locations,
waypoints associated with restroom locations,
waypoints associated with food service provider locations,
information pertaining to wait times for rides,
information pertaining to a schedule of events at the facility,
information pertaining to wait times for attractions at the facility, and
a method for reducing a wait times for accessing an attraction at the facility.

12. The method according to claim 1, further comprising a feature for supporting the user during an emergency condition, the feature comprising at least one of the following:

a step of notifying a user of an emergency condition,
a step of providing navigation to the user directing the user from the location of the mobile device and along an emergency exit route to an exit door to safely exit the facility, and
a step of identifying and tracking a location of at least one of a user and first response team member.

13. The method according to claim 1, further comprising a public transportation assistance feature providing at least one of:

a step of informing the user of a current location of at least one of a train, a bus, and a subway train along a route, wherein the location of the at least one of a train, a bus, and a subway train is identified upon said facility area map on a display of the mobile device; and
a step of providing navigation within the facility, wherein the facility is at least one of a train station, a subway station, and a bus terminal;
a step of providing waypoint information associated with at least one of a restroom location and a food service provider location within the facility, wherein the facility is at least one of a train station, a subway station, and a bus terminal;
a step of providing navigation to at least one of a restroom location and a food service provider location within the facility, wherein the facility is at least one of a train station, a subway station, and a bus terminal; and a step of providing navigation to the user directing the user from the location of the mobile device and along an emergency exit route to an exit to safely exit the facility, wherein the facility is at least one of a train station, a subway station, and a bus terminal.

14. The method according to claim 1, further comprising a roadway driving assistance feature and a step of:

installing infrastructure comprising a series of RF beacons along a roadway, each RF beacon being located proximate a road sign; and
providing at least one of:
a step of conveying information associated with a road sign to the user's mobile device, wherein the road sign is located proximate the location of the user's mobile device,
a step of conveying information associated with a road sign to a receiving device in communication with a vehicle computer, wherein the road sign is located proximate the location of the user's mobile device and the receiving device receives at least one of a Bluetooth signal and a Wi-Fi signal,
steps of conveying information associated with a road sign indicating a speed limit to a receiving device in communication with a vehicle computer, wherein the road sign is located proximate the location of the user's mobile device, informing the user to adjust a vehicle speed to remain in accordance with the indicated speed limit.

15. A business model method according to claim 1, further comprising steps of:

a. providing the location of the mobile device to a $3^{rd}$ party; and
b. triggering a location based service (LBS) based on at least one of the location of the mobile device, a user's behavior habit, and a preference/profile provide by the user, wherein the location based service (LBS) includes at least one of: navigation, area information, an advertising special, a sale, a promotional event, a coupon and emergency information.

16. The method according to claim 1, wherein said facility area is associated with a hospitality environment, wherein said hospitality environment is at least one of a cruise ship, a resort area, and a resort hotel, the method further comprising a employing hospitality environment infrastructure, wherein the infrastructure comprises a plurality of RF beacons installed at known locations about the hospitality environment; and at least one of:
a step of providing navigation about the hospitality environment, and
a step of providing navigation to at least one of a merchant location, an event location, a restroom location and a food service provider location within the hospitality environment, and
a step of providing navigation to the user directing the user from the location of the mobile device, along an emergency exit route with the hospitality environment, and to a safe location associated with the hospitality environment.

17. The method according to claim 1, further comprising steps of:

storing the RF beacon location index on the mobile device;
accessing the RF beacon location index to determine a location of the RF beacon associated with a received beacon signal;
utilizing the RF beacon location index and location of the RF beacon associated with a received beacon signal to determine the location of the mobile device.

18. The method according to claim 1, further comprising steps of:

installing the infrastructure of RF beacons inside one of a store and a department store; and at least one of:

utilizing the infrastructure of RF beacons inside one of a store and a department store to provide navigation on the mobile device to direct the user to a location of at least one of a product, a deal, and a special within the one of the store and the department store, conveying marketing information to the mobile device and displaying the marketing information on a display of the mobile device to notify the user thereof, and activating a location based service application, wherein the location based service application is associated with the one of the store and the department store proximate the location of the mobile device.

\* \* \* \* \*

UNITED STATES PATENT AND TRADEMARK OFFICE
CERTIFICATE OF CORRECTION

PATENT NO. : 8,941,485 B1
APPLICATION NO. : 12/932811
DATED : January 27, 2015
INVENTOR(S) : Ehud Mendelson Page 1 of 1

It is certified that error appears in the above-identified patent and that said Letters Patent is hereby corrected as shown below:

On the Title Page, Item (54) and in the Specification, Column 1, lines 1-4

IN THE TITLE:

Please Revise the Title as follows:

From:

"System And Method Of Obtaining And Using A Vehicle Identifier For Providing Information To An End User"

To:

-- Wi-Fi Or Bluetooth RF Beacon Infrastructure Enabling Indoor Navigation And Providing Location Based Services Applications In An Indoor Environment And Method Of Use --

Signed and Sealed this
Twenty-eighth Day of April, 2015

Michelle K. Lee
*Director of the United States Patent and Trademark Office*